US008630988B2

(12) United States Patent
Balogh

(10) Patent No.: US 8,630,988 B2
(45) Date of Patent: Jan. 14, 2014

(54) SYSTEM AND METHOD FOR PROCESSING DNS QUERIES

(75) Inventor: Aristotle Nicolas Balogh, Oakton, VA (US)

(73) Assignee: Verisign, Inc., Reston, VA (US)

( * ) Notice: Subject to any disclaimer, the term of this patent is extended or adjusted under 35 U.S.C. 154(b) by 385 days.

(21) Appl. No.: 12/331,498

(22) Filed: Dec. 10, 2008

(65) Prior Publication Data
US 2009/0106211 A1   Apr. 23, 2009

Related U.S. Application Data

(63) Continuation of application No. 11/641,054, filed on Dec. 19, 2006, now abandoned, which is a continuation of application No. 10/285,618, filed on Nov. 1, 2002, now Pat. No. 7,203,682.

(60) Provisional application No. 60/330,842, filed on Nov. 1, 2001, provisional application No. 60/365,169, filed on Mar. 19, 2002.

(51) Int. Cl.
*G06F 7/00* (2006.01)
*G06F 17/30* (2006.01)

(52) U.S. Cl.
USPC .......................................................... 707/705

(58) Field of Classification Search
USPC .......................................................... 707/705
See application file for complete search history.

(56) References Cited

U.S. PATENT DOCUMENTS

| 4,412,285 | A | 10/1983 | Neches et al. |
| 4,947,366 | A | 8/1990 | Johnson |
| 5,089,952 | A | 2/1992 | Bozman |
| 5,260,942 | A | 11/1993 | Auerbach et al. |
| 5,283,894 | A | 2/1994 | Deran |
| 5,287,496 | A | 2/1994 | Chen et al. |
| 5,301,287 | A | 4/1994 | Herrell et al. |
| 5,410,682 | A | 4/1995 | Sites et al. |
| 5,414,704 | A | 5/1995 | Spinney |

(Continued)

FOREIGN PATENT DOCUMENTS

| EP | 0817444 A2 | 1/1998 |
| JP | 11-327985 | 11/1999 |

(Continued)

OTHER PUBLICATIONS

Antoni, Wolski et al., "The RAPID Case Study: Requirements for and the Design of a Fast-Response Database System," *Proc. First Workshop on Real-Time Databases (RTDB '96)*, Mar. 7-8, 1996.

(Continued)

*Primary Examiner* — Charles Lu
(74) *Attorney, Agent, or Firm* — MH2 Technology Law Group, LLP

(57) ABSTRACT

Embodiments of the present invention provide a method and system for high-speed database searching with concurrent updating, without the use of database locks or access controls, for large database systems. Specifically, a plurality of search queries may be received over a network, the database may be searched, and a plurality of search replies may be sent over the network. While searching the database, new information received over the network may be incorporated into the database by creating a new element based on the new information and writing a pointer to the new element to the database using a single uninterruptible operation.

8 Claims, 9 Drawing Sheets

(56) References Cited

U.S. PATENT DOCUMENTS

| | | | |
|---|---|---|---|
| 5,632,015 A * | 5/1997 | Zimowski et al. | 707/702 |
| 5,729,735 A | 3/1998 | Meyering | |
| 5,758,150 A | 5/1998 | Bell et al. | |
| 5,787,452 A | 7/1998 | Mckenna | |
| 5,893,117 A | 4/1999 | Wang | |
| 5,920,886 A | 7/1999 | Feldmeier | |
| 5,924,096 A | 7/1999 | Draper et al. | |
| 5,924,098 A | 7/1999 | Kluge | |
| 5,926,816 A | 7/1999 | Bauer et al. | |
| 5,970,492 A | 10/1999 | Nielsen | |
| 5,974,409 A | 10/1999 | Sanu et al. | |
| 5,995,980 A | 11/1999 | Olson et al. | |
| 6,029,170 A | 2/2000 | Garger et al. | |
| 6,044,448 A | 3/2000 | Agrawal et al. | |
| 6,047,323 A | 4/2000 | Krause | |
| 6,098,108 A * | 8/2000 | Sridhar et al. | 709/239 |
| 6,188,428 B1 | 2/2001 | Koz et al. | |
| 6,216,135 B1 | 4/2001 | Brodersen et al. | |
| 6,223,187 B1 | 4/2001 | Boothby et al. | |
| 6,237,019 B1 | 5/2001 | Ault et al. | |
| 6,243,715 B1 | 6/2001 | Bogantz et al. | |
| 6,256,256 B1 | 7/2001 | Rao | |
| 6,304,259 B1 | 10/2001 | DeStefano | |
| 6,304,881 B1 | 10/2001 | Halim et al. | |
| 6,330,568 B1 | 12/2001 | Boothby et al. | |
| 6,360,220 B1 | 3/2002 | Forin | |
| 6,411,966 B1 | 6/2002 | Kwan et al. | |
| 6,438,723 B1 | 8/2002 | Kalliojarvi | |
| 6,449,657 B2 | 9/2002 | Stanbach, Jr. et al. | |
| 6,484,185 B1 | 11/2002 | Jain et al. | |
| 6,615,223 B1 | 9/2003 | Shih et al. | |
| 6,625,621 B2 | 9/2003 | Tan et al. | |
| 6,643,669 B1 | 11/2003 | Novak et al. | |
| 6,681,228 B2 | 1/2004 | Balogh | |
| 6,744,652 B2 * | 6/2004 | Srinivasan et al. | 365/49.11 |
| 6,868,414 B2 | 3/2005 | Khanna et al. | |
| 7,047,258 B2 | 5/2006 | Balogh et al. | |
| 7,167,877 B2 | 1/2007 | Balogh et al. | |
| 7,203,682 B2 | 4/2007 | Balogh | |
| 7,280,999 B2 | 10/2007 | Chung et al. | |
| 7,310,686 B2 | 12/2007 | Uysal | |
| 7,546,368 B2 | 6/2009 | Drees et al. | |
| 7,631,101 B2 | 12/2009 | Sullivan et al. | |
| 7,685,270 B1 | 3/2010 | Vermeulen et al. | |
| 7,694,016 B2 | 4/2010 | Halley | |
| 7,725,602 B2 | 5/2010 | Liu et al. | |
| 7,734,815 B2 | 6/2010 | Leighton et al. | |
| 7,761,570 B1 | 7/2010 | Halley | |
| 7,769,826 B2 | 8/2010 | Gustafsson | |
| 7,814,202 B2 | 10/2010 | Drees et al. | |
| 7,925,747 B2 | 4/2011 | Kirwan et al. | |
| 7,925,782 B2 | 4/2011 | Sivasubramanian et al. | |
| 7,930,393 B1 | 4/2011 | Baumback et al. | |
| 7,933,951 B2 | 4/2011 | Sullivan et al. | |
| 2001/0025320 A1 | 9/2001 | Seng et al. | |
| 2002/0029226 A1 | 3/2002 | Li et al. | |
| 2002/0147721 A1 * | 10/2002 | Gupta et al. | 707/100 |
| 2002/0156786 A1 | 10/2002 | Martin et al. | |
| 2003/0084057 A1 | 5/2003 | Balogh | |
| 2003/0084074 A1 | 5/2003 | Balogh et al. | |
| 2003/0084075 A1 | 5/2003 | Balogh et al. | |
| 2004/0039798 A1 | 2/2004 | Hotz et al. | |
| 2004/0254926 A1 | 12/2004 | Balogh | |
| 2005/0027882 A1 | 2/2005 | Sullivan et al. | |
| 2005/0105513 A1 | 5/2005 | Sullivan et al. | |
| 2007/0070820 A1 | 3/2007 | Gallant | |
| 2007/0100808 A1 | 5/2007 | Balogh | |
| 2007/0294419 A1 | 12/2007 | Ulevitch | |
| 2008/0059152 A1 | 3/2008 | Fridman et al. | |
| 2008/0071909 A1 | 3/2008 | Young et al. | |
| 2008/0133729 A1 | 6/2008 | Fridman et al. | |
| 2008/0155254 A1 | 6/2008 | Stradling | |
| 2008/0201413 A1 | 8/2008 | Sullivan et al. | |
| 2009/0106211 A1 | 4/2009 | Balogh | |
| 2009/0106390 A1 | 4/2009 | Kirwan, Jr. et al. | |
| 2009/0157889 A1 | 6/2009 | Treuhaft | |
| 2009/0235359 A1 | 9/2009 | Abdulhayoglu et al. | |
| 2009/0282027 A1 | 11/2009 | Subotin et al. | |
| 2009/0282028 A1 | 11/2009 | Subotin et al. | |
| 2009/0282038 A1 | 11/2009 | Subotin et al. | |
| 2010/0030897 A1 | 2/2010 | Stradling | |
| 2010/0077462 A1 | 3/2010 | Joffe et al. | |
| 2010/0138559 A1 | 6/2010 | Sullivan et al. | |
| 2010/0218040 A1 | 8/2010 | Bodmer et al. | |
| 2010/0257266 A1 | 10/2010 | Holmes et al. | |
| 2010/0274836 A1 | 10/2010 | Orentas et al. | |
| 2010/0274970 A1 | 10/2010 | Treuhaft et al. | |
| 2010/0287532 A1 | 11/2010 | Smith et al. | |
| 2010/0318858 A1 | 12/2010 | Essawi et al. | |
| 2011/0022678 A1 | 1/2011 | Smith et al. | |
| 2011/0029662 A1 | 2/2011 | Drees et al. | |
| 2011/0035469 A1 | 2/2011 | Smith et al. | |
| 2011/0035497 A1 | 2/2011 | Daly et al. | |
| 2011/0047292 A1 | 2/2011 | Gould et al. | |
| 2011/0051728 A1 | 3/2011 | Bhogavilli et al. | |
| 2011/0106891 A1 | 5/2011 | Gallant et al. | |
| 2011/0110267 A1 | 5/2011 | Gallant | |
| 2011/0161289 A1 | 6/2011 | Pei et al. | |

FOREIGN PATENT DOCUMENTS

| | | |
|---|---|---|
| JP | 2000-57030 | 2/2000 |
| JP | 2001-236257 | 8/2001 |
| JP | 2001-290689 | 10/2001 |
| WO | WO 96/21898 | 7/1996 |
| WO | 0052594 A2 | 9/2000 |

OTHER PUBLICATIONS

Ulosoy, O et al., "Real-Time Concurrency Control Protocol for Main-Memory Database Systems," *Information Systems*, Pergamon Press, Oxford, GB, vol. 23, No. 2, Apr. 1, 1998, pp. 109-125.

Garcia-Molina, H et al., "Main Memory Database Systems: An Overview," *IEEE Transactions on Knowledge and Data Engineering*, IEEE Service Center, Los Alamitos, CA, US, vol. 4, No. 6, Dec. 1, 1992, pp. 509-516.

Halici, U et al., "Concurrency Control in Distributed Databases Through Dummy Locks," *Information Technology*, 1990. 'Next Decade in Information Technology', Proceedings of the 5th Jerusalem Conference on (Cat. No. 90TH0326-9) Jerusalem, Israel Oct. 22-25, 1990, Los Alamitos, CA, USA, IEEE Comput. Soc, US, Oct. 22, 1990, pp. 576-585.

Chiu, A et al., "Comparing Two-Phase Locking and Optimistic Concurrency Control Protocols in Multiprocessor Real-Time Databases," *Parallel and Distributed Real-Time Systems*, 1997. Proceedings of the Joint Workshop on Geneva, Switzerland Apr. 1-3, 1997, Los Alamitos, CA, USA, IEEE Comput. Soc, US, Apr. 1, 1997, pp. 141-148.

Graham, M H, "How to Get Serializability for Real-Time Transactions Without Having to Pay for It," *Real-Time Systems Symposium*, 1993, Proceedings. Raleigh Durham, NC, USA Dec. 1-3, 1993, Los Alamitos, CA, USA, IEEE Comput. Soc, Dec. 1, 1993, pp. 56-65.

L. Bentley and Robert Sedgewick, "Fast Algorithms for Sorting and Searching Strings," *Proceedings of the Eighth Annual ACM-SIAM Symposium on Discrete Algorithms*, [Online] 1997, pp. 360-369.

Hong, Jun Lu et al., "T-Tree or B-Tree: Main Memory Database Index Structure Revisited," *Database Conference*, 2000. ADC 2000. Proceedings. 11th Australasian Canberra, Act, Australia Jan. 31-Feb. 3, 2000, Los Alamitos, CA, USA, IEEE Comput. Soc, US, Jan. 31, 2000, pp. 65-73.

Kong-Rim, Choi et al., "T*-Tree: A Main Memory Database Index Structure for Real Time Applications," *Real-Time Computing Systems and Applications*, 1996. Proceedings, Third International Workshop on Seoul, South Korea Oct. 30-Nov. 1, 1996, Los Alamitos, CA, USA, IEEE Computer. Soc, US, Oct. 30, 1996, pp. 81-88.

Jeon, H S et al., "A Low Overhead Index Structure for Dynamic Main Memory Database Management Systems," *IEICE Transactions on Information and Systems, Information & Systems Society*, Tokyo, JP, vol. E84-D, No. 9, Sep. 1, 2001, pp. 1164-1170.

(56) References Cited

OTHER PUBLICATIONS

Rabinovich, M et al., "Scalable Update Propagation in Epidemic Replicated Databases," *Advances in Database Technology—EDBT'96.* 5th International Conference on Extending Database Technology. Proceedings Springer-Verlag Berlin, Germany, (Online) 1996, pp. 207-222.

Mukesh, Singhal, "Update Transport: A New Technique for Update Synchronization in Replicated Database Systems," *IEEE Transactions on Software Engineering*, IEEE Service Center, Los Alamitos, CA, US, vol. 16, No. 12, Dec. 1, 1990, pp. 1325-1336.

Delmolino, Dominic J, "Strategies and Techniques for Using Oracle7 Replication," Internet Citation, (Online) 1995, XP002267343.

Pacitti, Esther et al., "Replica Consistency in Lazy Master Replicated Databases," *Distributed and Parallel Databases*, (Online) May 2001, pp. 237-267.

Holliday, Joanne et al., "Database Replication Using Epidemic Update," *Technical Report* TRCS00-01 (Onl ine) 2000, XP002533554.

Wiesmann, M et al., "Understanding Replication in Databases and Distributed Systems," *Distributed Computing Systems*, 2000. Proceedings. 20th International Conference on Taipei, Taiwan Apr. 10-13, 2000, Los Alamitos, CA, USA, IEEE Comput. Soc, US, Apr. 10, 2000, pp. 464-474.

Gray, J et al., "The Dangers of Replication and a Solution," Sigmod Record, ACM, New York, NY, US, vol. 25, No. 2, Jun. 4, 1996, pp. 173-182.

Wiesmann, M et al., "Database Replication Techniques: A Three Parameter Classification," *Reliable Distributed Systems*, 2000. SRDS-2000. Proceedings the 19th IEEE Symposium on Nurnberg, Germany Oct. 16-18, 2000, Los Alamitos, CA, USA, IEEE Comput. Soc, US, Oct. 16, 2000 pp. 206-215.

Vixie, P et al., "RFC 2136—Dynamic Updates in the Domain Name System (DNS Update)," Internet Citation, (Online), XP002174064.

Office Action for JP application No. JP2003/540847 issued Apr. 7, 2009.

International Search Report for PCT/US02/35080 issued Jan. 27, 2003.

International Search Report for PCT/US02/35083 issued Dec. 30, 2002.

International Search Report for PCT/US02/35082 issued Feb. 5, 2003.

International Search Report for PCT/US02/35081 issued Jan. 15, 2003.

Supplementary European Search Report for EP 02802514 issued Jun. 23, 2009.

Supplementary European Search Report for EP 02802515 issued Jun. 25, 2009.

Supplementary European Search Report for EP 02786633 issued Jun. 23, 2009.

Supplementary European Search Report for EP 02786632 issued Jun. 25, 2009.

Oracle8/Parallel Server Concepts and Administration, Release 8.1.5, Chapter 10: *Non-PCM Instance Locks* [online], [retrieved on Jan. 23, 2003], 4 pages.

Cray T3E Fortran Optimization Guide © 1996, 1999 Cray Research Inc., Table of Contents and Glossary. Online, http://docs.cray.com/books/004-2518-002/index.html. 16 pages.

Kangasharju et al., "A Replicated Architecture for the Domain Name System", IEEE INFOCOM, 2000, pp. 660-669.

Extended European Search Report dated Aug. 12, 2013, EP Application No. 11181796.1, filed Nov. 1, 2002, pp. 1-7.

* cited by examiner

SYSTEM AND METHOD FOR PROCESSING DNS QUERIES

CLAIM FOR PRIORITY/CROSS REFERENCE TO RELATED APPLICATIONS

This is a continuation of U.S. application Ser. No. 11/641,054, filed Dec. 19, 2006, which is a continuation of U.S. application Ser. No. 10/285,618 filed Nov. 1, 2002, which claims the benefit of U.S. provisional Application No. 60/330,842, filed Nov. 1, 2001, and U.S. provisional application No. 60/365,169, filed Mar. 19, 2002, each of which is incorporated by reference in its entirety for all purposes. This application is related to U.S. non-provisional application Ser. No. 10/285,575 filed Nov. 1, 2002, now U.S. Pat. No. 6,681,228 B2; No. 10/285,544 filed Nov. 1, 2002; No. 10/285,549 filed Nov. 1, 2002; and No. 10/285,547 filed Nov. 1, 2002.

TECHNICAL FIELD

This disclosure relates to computer systems. More specifically, this disclosure relates to a method and system for providing high-speed database searching with concurrent updating, without the use of database locks or access controls, for large database systems.

BACKGROUND OF THE INVENTION

As the Internet continues its meteoric growth, scaling domain name service (DNS) resolution for root and generic top level domain (gTLD) servers at reasonable price points is becoming increasingly difficult. The A root server (i.e., a.root-server.net) maintains and distributes the Internet namespace root zone file to the 12 secondary root servers geographically distributed around the world (i.e., b.rootserver.net, c.root-server.net, etc.), while the corresponding gTLD servers (i.e., a.gtld-servers.net, b.gtld-servers.net, etc.) are similarly distributed and support the top level domains (e.g., *.corn, *.net, *.org, etc.). The ever-increasing volume of data coupled with the unrelenting growth in query rates is forcing a complete rethinking of the hardware and software infrastructure needed for root and gTLD DNS service over the next several years. The typical single server installation of the standard "bind" software distribution is already insufficient for the demands of the A root and will soon be unable to meet even gTLD needs. With the convergence of the public switched telephone network (PSTN) and the Internet, there are opportunities for a general purpose, high performance search mechanism to provide features normally associated with Service Control Points (SCPs) on the PSTN's SS7 signaling network as new, advanced services are offered that span the PSTN and the Internet, including Advanced Intelligent Network (AIN), Voice Over Internet Protocol (VoIP) services, geolocation services, etc.

DETAILED DESCRIPTION

Embodiments of the present invention provide a method and system for high-speed database searching with concurrent updating, without the use of database locks or access controls, for large database systems. Specifically, a plurality of search queries may be received over a network, the database may be searched, and a plurality of search replies may be sent over the network. While searching the database, new information received over the network may be incorporated into the database by creating a new element based on the new information and, without locking the database, writing a pointer to the new element to the database using a single uninterruptible operation.

Figure 1:
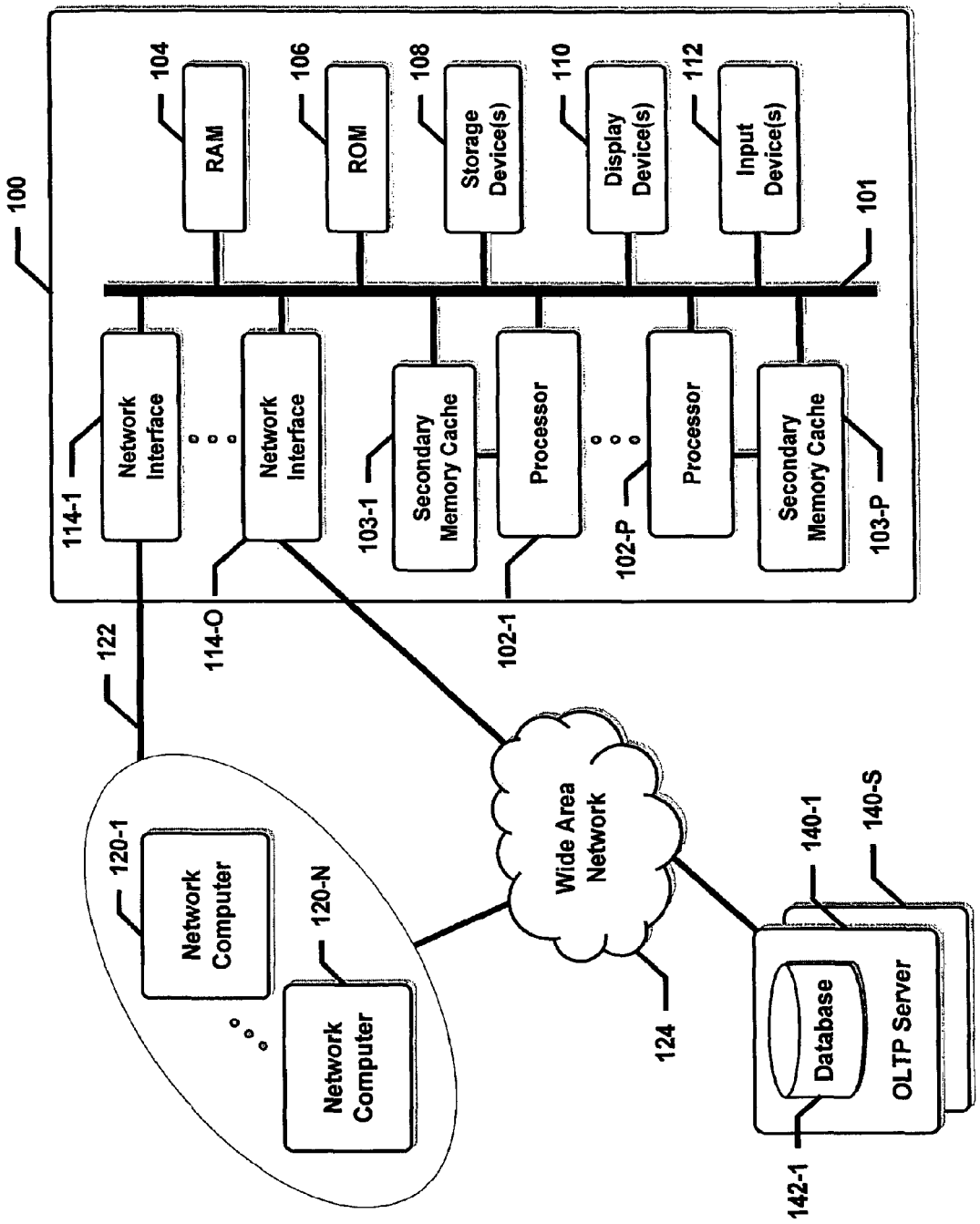
FIG. 1 is a system block diagram, according to an embodiment of the present invention.

FIG. 1 is a block diagram that illustrates a system according to an embodiment of the present invention. Generally, system 100 may host a large, memory-resident database, receive search requests and provide search responses over a network. For example, system 100 may be a symmetric, multiprocessing (SMP) computer, such as, for example, an IBM RS/6000® M80 or S80 manufactured by International Business Machines Corporation of Armonk, N.Y., a Sun Enterprise™ 10000 manufactured by Sun Microsystems, Inc. of Santa Clara, Calif., etc. System 100 may also be a multiprocessor personal computer, such as, for example, a Compaq ProLiant™ ML530 (including two Intel Pentium® III 866 MHz processors) manufactured by Hewlett-Packard Company of Palo Alto, Calif. System 100 may also include a multiprocessing operating system, such as, for example, IBM AIX® 4, Sun Solaris™ 8 Operating Environment, Red Hat Linux® 6.2, etc. System 100 may receive periodic updates over network 124, which may be concurrently incorporated into the database. Embodiments of the present invention may achieve very high database search and update throughput by incorporating each update to the database without the use of database locks or access controls.

In an embodiment, system 100 may include at least one processor 102-1 coupled to bus 101. Processor 102-1 may include an internal memory cache (e.g., an L1 cache, not shown for clarity). A secondary memory cache 103-1 (e.g., an L2 cache, L2/L3 caches, etc.) may reside between processor 102-1 and bus 101. In a preferred embodiment, system 100 may include a plurality of processors 102-1 ... 102-P coupled to bus 101. A plurality of secondary memory caches 103-1 ... 103-P may also reside between plurality of processors 102-1 ... 102-P and bus 101 (e.g., a look-through architecture), or, alternatively, at least one secondary memory cache 103-1 may be coupled to bus 101 (e.g., a look-aside architecture). System 100 may include memory 104, such as, for example, random access memory (RAM), etc., coupled to bus 101, for storing information and instructions to be executed by plurality of processors 102-1 . . . 102-P.

Memory 104 may store a large database, for example, for translating Internet domain names into Internet addresses, for translating names or phone numbers into network addresses, for providing and updating subscriber profile data, for providing and updating user presence data, etc. Advantageously, both the size of the database and the number of translations per second may be very large. For example, memory 104 may include at least 64 GB of RAM and may host a 500M (i.e., 500×10$^6$) record domain name database, a 500M record subscriber database, a 450M record telephone number portability database, etc.

On an exemplary 64-bit system architecture, such as, for example, a system including at least one 64-bit big-endian processor 102-1 coupled to at least a 64-bit bus 101 and a 64-bit memory 104, an 8-byte pointer value may be written to a memory address on an 8-byte boundary (i.e., a memory address divisible by eight, or, e.g., 8N) using a single, uninterruptible operation. Generally, the presence of secondary memory cache 103-1 may simply delay the 8-byte pointer write to memory 104. For example, in one embodiment, secondary memory cache 103-1 may be a look-through cache operating in write-through mode, so that a single, 8-byte store instruction may move eight bytes of data from processor 102-1 to memory 104, without interruption, and in as few as two system clock cycles. In another embodiment, secondary memory cache 1031 may be a look-through cache operating in write-back mode, so that the 8-byte pointer may first be written to secondary memory cache 103-1, which may then write the 8-byte pointer to memory 104 at a later time, such as, for example, when the cache line in which the 8-byte pointer is stored is written to memory 104 (i.e., e.g., when the particular cache line, or the entire secondary memory cache, is "flushed").

Ultimately, from the perspective of processor 102-1, once the data are latched onto the output pins of processor 102-1, all eight bytes of data are written to memory 104 in one contiguous, uninterrupted transfer, which may be delayed by the effects of a secondary memory cache 103-1, if present. From the perspective of processors 102-2 . . . 102-P, once the data are latched onto the output pins of processor 102-1, all eight bytes of data are written to memory 104 in one contiguous, uninterrupted transfer, which is enforced by the cache coherency protocol across secondary memory caches 103-1 . . . 103-P, which may delay the write to memory 104 if present.

However, if an 8-byte pointer value is written to a misaligned location in memory 104, such as a memory address that crosses an 8-byte boundary, all eight bytes of data can not be transferred from processor 102-1 using a single, 8-byte store instruction. Instead, processor 102-1 may issue two separate and distinct store instructions. For example, if the memory address begins four bytes before an 8-byte boundary (e.g., 8N−4), the first store instruction transfers the four most significant bytes to memory 104 (e.g., 8N−4), while the second store instruction transfers the four least significant bytes to memory 104 (e.g., 8N). Importantly, between these two separate store instructions, processor 102-1 may be interrupted, or, processor 102-1 may loose control of bus 101 to another system component (e.g., processor 102-P, etc.). Consequently, the pointer value residing in memory 104 will be invalid until processor 102-1 can complete the second store instruction. If another component begins a single, uninterruptible memory read to this memory location, an invalid value will be returned as a presumably valid one.

Similarly, a new 4-byte pointer value may be written to a memory address divisible by four (e.g., 4N) using a single, uninterruptible operation. Note that in the example discussed above, a 4-byte pointer value may be written to the 8N−4 memory location using a single store instruction. Of course, if a 4-byte pointer value is written to a location that crosses a 4-byte boundary, e.g., 4N−2, all four bytes of data can not be transferred from processor 102-1 using a single store instruction, and the pointer value residing in memory 104 may be invalid for some period of time.

System 100 may also include a read only memory (ROM) 106, or other static storage device, coupled to bus 101 for storing static information and instructions for processor 102-1. A storage device 108, such as a magnetic or optical disk, may be coupled to bus 101 for storing information and instructions. System 100 may also include display 110 (e.g., an LCD monitor) and input device 112 (e.g., keyboard, mouse, trackball, etc.), coupled to bus 101. System 100 may include a plurality of network interfaces 114-1 . . . 114-O, which may send and receive electrical, electromagnetic or optical signals that carry digital data streams representing various types of information. In an embodiment, network interface 114-1 may be coupled to bus 101 and local area network (LAN) 122, while network interface 114-O may coupled to bus 101 and wide area network (WAN) 124. Plurality of network interfaces 114-1 . . . 114-O may support various network protocols, including, for example, Gigabit Ethernet (e.g., IEEE Standard 802.3-2002, published 2002), Fiber Channel (e.g., ANSI Standard X.3230-1994, published 1994), etc. Plurality of network computers 120-1 . . . 120-N may be coupled to LAN 122 and WAN 124. In one embodiment, LAN 122 and WAN 124 may be physically distinct networks, while in another embodiment, LAN 122 and WAN 124 may be via a network gateway or router (not shown for clarity). Alternatively, LAN 122 and WAN 124 may be the same network.

As noted above, system 100 may provide DNS resolution services. In a DNS resolution embodiment, DNS resolution services may generally be divided between network transport and data look-up functions. For example, system 100 may be a back-end look-up engine (LUE) optimized for data look-up on large data sets, while plurality of network computers 120-1 . . . 120-N may be a plurality of front-end protocol engines (PEs) optimized for network processing and transport. The LUE may be a powerful multiprocessor server that stores the entire DNS record set in memory 104 to facilitate high-speed, high-throughput searching and updating. In an alternative embodiment, DNS resolution services may be provided by a series of powerful multiprocessor servers, or LUEs, each storing a subset of the entire DNS record set in memory to facilitate high-speed, high-throughput searching and updating.

Conversely, the plurality of PEs may be generic, low profile, PC-based machines, running an efficient multitasking operating system (e.g., Red Hat Linux® 6.2), that minimize the network processing transport load on the LUE in order to maximize the available resources for DNS resolution. The PEs may handle the nuances of wire-line DNS protocol, respond to invalid DNS queries and multiplex valid DNS queries to the LUE over LAN 122. In an alternative embodiment including multiple LUEs storing DNS record subsets, the PEs may determine which LUE should receive each valid DNS query, and multiplex valid DNS queries to the appropriate LUEs. The number of PEs for a single LUE may be determined, for example, by the number of DNS queries to be processed per second and the performance characteristics of the particular system. Other metrics may also be used to determine the appropriate mapping ratios and behaviors.

Generally, other large-volume, query-based embodiments may be supported, including, for example, telephone number resolution, SS7 signaling processing, geolocation determination, telephone number-to-subscriber mapping, subscriber location and presence determination, etc.

In an embodiment, a central on-line transaction processing (OLTP) server 140-1 may be coupled to WAN 124 and receive additions, modifications and deletions (i.e., update traffic) to database 142-1 from various sources. OLTP server 140-1 may send updates to system 100, which includes a local copy of database 142-1, over WAN 124. OLTP server 140-1 may be optimized for processing update traffic in various formats and protocols, including, for example, HyperText Transmission Protocol (HTTP), Registry Registrar Protocol (RRP), Extensible Provisioning Protocol (EPP), Service Management System/800 Mechanized Generic Interface (MGI), and other on-line provisioning protocols. A constellation of read-only LUEs may be deployed in a hub and spoke architecture to provide high-speed search capability conjoined with high-volume, incremental updates from OLTP server 140-1.

In an alternative embodiment, data may be distributed over multiple OLTP servers 140-1 . . . 140-S, each of which may be coupled to WAN 124. OLTP servers 140-1 . . . 140-S may receive additions, modifications, and deletions (i.e., update traffic) to their respective databases 142-1 . . . 142-S (not shown for clarity) from various sources. OLTP servers 140-1 . . . 140-S may send updates to system 100, which may include copies of databases 142-1 . . . 142-S, other dynamically-created data, etc., over WAN 124. For example, in a geolocation embodiment, OLTP servers 140-1 . . . 140-S may receive update traffic from groups of remote sensors. In another alternative embodiment, plurality of network computers 120-1 . . . 120-N may also receive additions, modifications, and deletions (i.e., update traffic) from various sources over WAN 124 or LAN 122. In this embodiment, plurality of network computers 120-1 . . . 120-N may send updates, as well as queries, to system 100.

In the DNS resolution embodiment, each PE (e.g., each of the plurality of network computers 120-1 . . . 120-N) may combine, or multiplex, several DNS query messages, received over a wide area network (e.g., WAN 124), into a single Request SuperPacket and send the Request Super-Packet to the LUE (e.g., system 100) over a local area network (e.g., LAN 122). The LUE may combine, or multiplex, several DNS query message replies into a single Response SuperPacket and send the Response SuperPacket to the appropriate PE over the local area network. Generally, the maximum size of a Request or Response SuperPacket may be limited by the maximum transmission unit (MTU) of the physical network layer (e.g., Gigabit Ethernet). For example, typical DNS query and reply message sizes of less than 100 bytes and 200 bytes, respectively, allow for over 30 queries to be multiplexed into a single Request SuperPacket, as well as over 15 replies to be multiplexed into a single Response SuperPacket. However, a smaller number of queries (e.g., 20 queries) may be included in a single Request SuperPacket in order to avoid MTU overflow on the response (e.g., 10 replies). For larger MTU sizes, the number of multiplexed queries and replies may be increased accordingly.

Each multitasking PE may include an inbound thread and an outbound thread to manage DNS queries and replies, respectively. For example, the inbound thread may un-marshal the DNS query components from the incoming DNS query packets received over a wide area network and multiplex several milliseconds of queries into a single Request SuperPacket. The inbound thread may then send the Request SuperPacket to the LUE over a local area network. Conversely, the outbound thread may receive the Response SuperPacket from the LUE, de-multiplex the replies contained therein, and marshal the various fields into a valid DNS reply, which may then be transmitted over the wide area network. Generally, as noted above, other large-volume, query-based embodiments may be supported.

In an embodiment, the Request SuperPacket may also include state information associated with each DNS query, such as, for example, the source address, the protocol type, etc. The LUE may include the state information, and associated DNS replies, within the Response SuperPacket. Each PE may then construct and return valid DNS reply messages using the information transmitted from the LUE. Consequently, each PE may advantageously operate as a stateless machine, i.e., valid DNS replies may be formed from the information contained in the Response SuperPacket. Generally, the LUE may return the Response SuperPacket to the PE from which the incoming SuperPacket originated; however, other variations may obviously be possible.

In an alternative embodiment, each PE may maintain the state information associated with each DNS query and include a reference, or handle, to the state information within the Request SuperPacket. The LUE may include the state information references, and associated DNS replies, within the Response SuperPacket. Each PE may then construct and return valid DNS reply messages using the state information references transmitted from the LUE, as well as the state information maintained thereon. In this embodiment, the LUE may return the Response SuperPacket to the PE from which the incoming SuperPacket originated.

Figure 2:
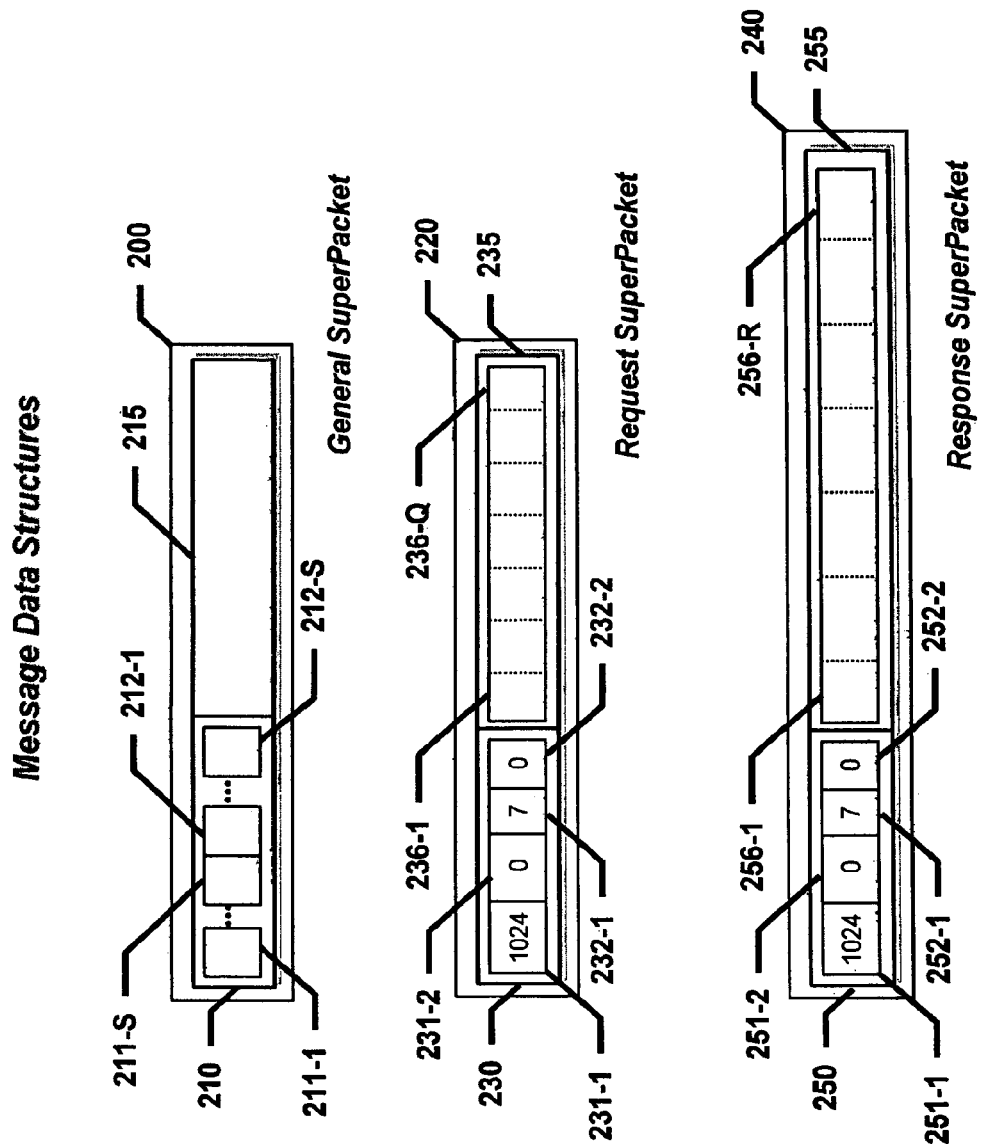
FIG. 2 is a detailed block diagram that illustrates a message data structure, according to an embodiment of the present invention.

FIG. 2 is a detailed block diagram that illustrates a message data structure, according to an embodiment of the present invention. Generally, message 200 may include header 210, having a plurality of sequence number 211-1 . . . 211-S and a plurality of message counts 212-1 . . . 212-S, and data payload 215.

In the DNS resolution embodiment, message 200 may be used for Request SuperPackets and Response SuperPackets. For example, Request SuperPacket 220 may include header 230, having a plurality of sequence number 231-1 . . . 231-S and a plurality of message counts 232-1 . . . 232-S, and data payload 235 having multiple DNS queries 236-1 . . . 236-Q, accumulated by a PE over a predetermined period of time, such as, for example, several milliseconds. In one embodiment, each DNS query 236-1 . . . 236-Q may include state information, while in an alternative embodiment, each DNS query 236-1 . . . 236-Q may include a handle to state information.

Similarly, Response SuperPacket 240 may include header 250, having a plurality of sequence number 251-1 . . . 251-S and a plurality of message counts 252-1 . . . 252-S, and data payload 255 having multiple DNS replies 256-1 . . . 256-R approximately corresponding to the multiple DNS queries contained within Request SuperPacket 220. In one embodiment, each DNS reply 256-1 . . . 256-R may include state information associated with the corresponding DNS query, while in an alternative embodiment, each DNS reply 256-1 . . . 256-R may include a handle to state information associated with the corresponding DNS query. Occasionally, the total size of the corresponding DNS replies may exceed the size of data payload 255 of the Response SuperPacket 240. This overflow may be limited, for example, to a single reply, i.e., the reply associated with the last query contained within Request SuperPacket 220. Rather than sending an additional Response SuperPacket 240 containing only the single reply, the overflow reply may be preferably included in the next Response SuperPacket 240 corresponding to the next Request SuperPacket. Advantageously, header 250 may include appropriate information to determine the extent of the overflow condition. Under peak processing conditions, more than one reply may overflow into the next Response SuperPacket.

For example, in Response SuperPacket 240, header 250 may include at least two sequence numbers 251-1 and 251-2 and at least two message counts 252-1 and 252-2, grouped as two pairs of complementary fields. While there may be "S" number of sequence number and message count pairs, typically, S is a small number, such as, e.g., 2, 3, 4, etc. Thus, header 250 may include sequence number 251-1 paired with message count 252-1, sequence number 251-2 paired with message count 252-2, etc. Generally, message count 252-1 may reflect the number of replies contained within data payload 255 that are associated with sequence number 251-1. In an embodiment, sequence number 251-1 may be a two-byte field, while message count 252-1 may be a one-byte field.

In a more specific example, data payload 235 of Request SuperPacket 220 may include seven DNS queries (as depicted in FIG. 2). In one embodiment, sequence number 231-1 may be set to a unique value (e.g., 1024) and message count 232-1 may be set to seven, while sequence number 231-2 and message count 232-2 may be set to zero. In another embodiment, header 230 may contain only one sequence number and one message count, e.g., sequence number 231-1 and message count 232-1 set to 1024 and seven, respectively. Typically, Request SuperPacket 220 may contain all of the queries associated with a particular sequence number.

Data payload 255 of Response SuperPacket 240 may include seven corresponding DNS replies (as depicted in FIG. 2). In this example, header 250 may include information similar to Request SuperPacket 220, i.e., sequence number 251-1 set to the same unique value (i.e., 1024), message count 252-1 set to seven, and both sequence number 252-2 and message count 252-2 set to zero. However, in another example, data payload 255 of Response SuperPacket 240 may include only five corresponding DNS replies, and message count 252-1 may be set to five instead. The remaining two responses associated with sequence number 1024 may be included within the next Response SuperPacket 240.

The next Request SuperPacket 240 may include a different sequence number (e.g., 1025) and at least one DNS query, so that the next Response SuperPacket 240 may include the two previous replies associated with the 1024 sequence number, as well as at least one reply associated with the 1025 sequence number. In this example, header 250 of the next Response SuperPacket 240 may include sequence number 251-1 set to 1024, message count 252-1 set to two, sequence number 251-2 set to 1025 and message count 252-2 set to one. Thus, Response SuperPacket 240 may include a total of three replies associated with three queries contained within two different Request SuperPackets.

Figure 3:
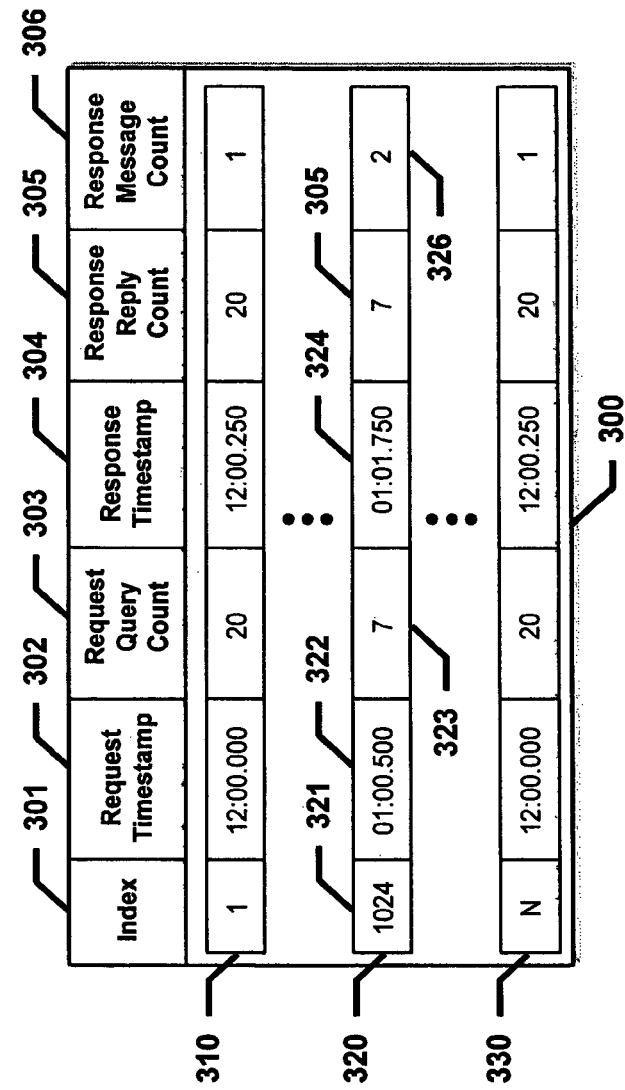
FIG. 3 is a detailed block diagram that illustrates a message latency data structure architecture, according to an embodiment of the present invention.

FIG. 3 is a detailed block diagram that illustrates a message latency data structure architecture, according to an embodiment of the present invention. Message latency data structure 300 may include information generally associated with the transmission and reception of message 200. In the DNS resolution embodiment, message latency data structure 300 may include latency information about Request SuperPackets and Response SuperPackets; this latency information may be organized in a table format indexed according to sequence number value (e.g., index 301). For example, message latency data structure 300 may include a number of rows N equal to the total number of unique sequence numbers, as illustrated, generally, by table elements 310, 320 and 330. In an embodiment, SuperPacket header sequence numbers may be two bytes in length and define a range of unique sequence numbers from zero to $2^{16}-1$ (i.e., 65,535). In this case, N may be equal to 65,536. Latency information may include Request Timestamp 302, Request Query Count 303, Response Timestamp 304, Response Reply Count 305, and Response Message Count 306. In an alternative embodiment, latency information may also include an Initial Response Timestamp (not shown).

In an example, table element 320 illustrates latency information for a Request SuperPacket 220 having a single sequence number 231-1 equal to 1024. Request Timestamp 302 may indicate when this particular Request SuperPacket was sent to the LUE. Request Query Count 303 may indicate how many queries were contained within this particular Request SuperPacket. Response Timestamp 304 may indicate when a Response SuperPacket having a sequence number equal to 1024 was received at the PE (e.g., network computer 120-N) and may be updated if more than one Response SuperPacket is received at the PE. Response Reply Count 305 may indicate the total number of replies contained within all of the received Response SuperPackets associated with this sequence number (i.e., 1024). Response Message Count 306 may indicate how many Response SuperPackets having this sequence number (i.e., 1024) arrived at the PE. Replies to the queries contained within this particular Request SuperPacket may be split over several Response SuperPackets, in which case, Response Timestamp 304, Response Reply Count 305, and Response Message Count 306 may be updated as each of the additional Response SuperPackets are received. In an alternative embodiment, the Initial Response Timestamp may indicate when the first Response SuperPacket containing replies for this sequence number (i.e., 1024) was received at the PE. In this embodiment, Response Timestamp 304 may be updated when additional (i.e., second and subsequent) Response SuperPackets are received.

Various important latency metrics may be determined from the latency information contained within message latency data structure 300. For example, simple cross-checking between Request Query Count 303 and Response Reply Count 305 for a given index 301 (i.e., sequence number) may indicate a number of missing replies. This difference may indicate the number of queries inexplicably dropped by the LUE. Comparing Request Timestamp 302 and Response Timestamp 304 may indicate how well the particular PE/LUE combination may be performing under the current message load. The difference between the current Request SuperPacket sequence number and the current Response SuperPacket sequence number may be associated with the response performance of the LUE; e.g., the larger the difference, the slower the performance. The Response Message Count 306 may indicate how many Response SuperPackets are being used for each Request SuperPacket, and may be important in DNS resolution traffic analysis. As the latency of the queries and replies travelling between the PEs and LUE increases, the PEs may reduce the number of DNS query packets processed by the system.

Generally, the LUE may perform a multi-threaded look-up on the incoming, multiplexed Request SuperPackets, and may combine the replies into outgoing, multiplexed Response SuperPackets. For example, the LUE may spawn one search thread, or process, for each active PE and route all the incoming Request SuperPackets from that PE to that search thread. The LUE may spawn a manager thread, or process, to control the association of PEs to search threads, as well as an update thread, or process, to update the database located in memory 104. Each search thread may extract the search queries from the incoming Request SuperPacket, execute the various searches, construct an outgoing Response SuperPacket containing the search replies and send the SuperPacket to the appropriate PE. The update thread may receive updates to the database, from OLTP 140-1, and incorporate the new data into the database. In an alternative embodiment, plurality of network computers 120-1 . . . 120-N may send updates to system 100. These updates may be included, for example, within the incoming Request SuperPacket message stream.

Accordingly, by virtue of the SuperPacket protocol, the LUE may spend less than 15% of its processor capacity on network processing, thereby dramatically increasing search query throughput. In an embodiment, an IBM® 8-way M80 may sustain search rates of 180 k to 220 k queries per second (qps), while an IBM® 24-way S80 may sustain 400 k to 500 k qps. Doubling the search rates, i.e., to 500 k and 1M qps, respectively, simply requires twice as much hardware, i.e., e.g., two LUEs with their attendant PEs. In another embodiment, a dual Pentium® III 866 MHz multi-processor personal computer operating Red Hat Linux® 6.2 may sustain update rates on the order of 100K/sec. Of course, increases in hardware performance also increase search and update rates associated with embodiments of the present invention, and as manufacturers replace these multiprocessor computers with faster-performing machines, for example, the sustained search and update rates may increase commensurately. Generally, system 100 is not limited to a client or server architecture, and embodiments of the present invention are not limited to any specific combination of hardware and/or software.

Figure 4:
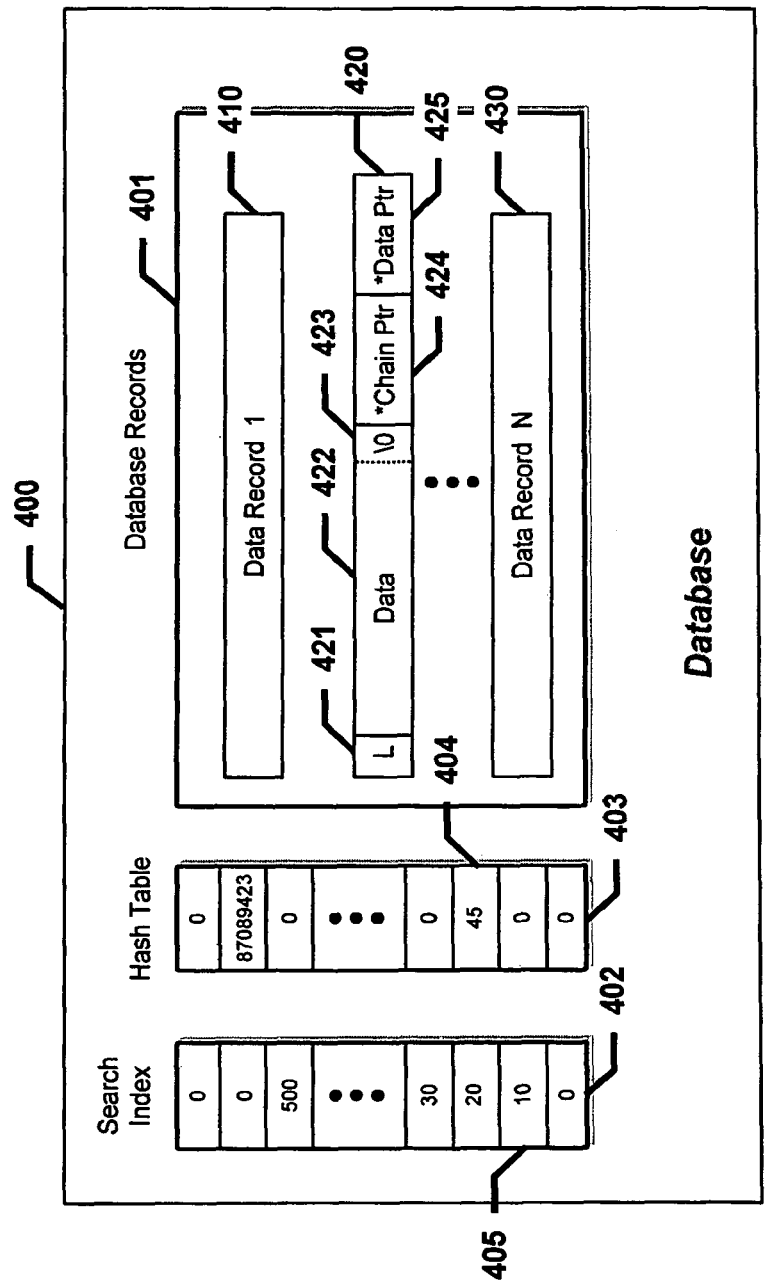
FIG. 4 is a detailed block diagram that illustrates a non-concurrency controlled data structure architecture, according to an embodiment of the present invention.

FIG. 4 is a block diagram that illustrates a general database architecture according to an embodiment of the present invention. In this embodiment, database 400 may include at least one table or group of database records 401, and at least one corresponding search index 402 with pointers (indices, direct byte-offsets, etc.) to individual records within the group of database records 401. For example, pointer 405 may reference database record 410.

In one embodiment, database 400 may include at least one hash table 403 as a search index with pointers (indices, direct byte-offsets, etc.) into the table or group of database records 401. A hash function may map a search key to an integer value which may then be used as an index into hash table 403. Because more than one search key may map to a single integer value, hash buckets may be created using a singly-linked list of hash chain pointers. For example, each entry within hash table 403 may contain a pointer to the first element of a hash bucket, and each element of the hash bucket may contain a hash chain pointer to the next element, or database record, in the linked-list. Advantageously, a hash chain pointer may be required only for those elements, or database records, that reference a subsequent element in the hash bucket.

Hash table 403 may include an array of 8-byte pointers to individual database records 401. For example, hash pointer 404 within hash table 403 may reference database record 420 as the first element within a hash bucket. Database record 420 may contain a hash chain pointer 424 which may reference the next element, or database record, in the hash bucket. Database record 420 may also include a data length 421 and associated fixed or variable-length data 422. In an embodiment, a null character 423, indicating the termination of data 422, may be included. Additionally, database record 420 may include a data pointer 425 which may reference another database record, either within the group of database records 401 or within a different table or group of database records (not shown), in which additional data may be located.

System 100 may use various, well-known algorithms to search this data structure architecture for a given search term or key. Generally, database 400 may be searched by multiple search processes, or threads, executing on at least one of the plurality of processors 102-1 . . . 102-P. However, modifications to database 400 may not be integrally performed by an update thread (or threads) unless the search thread(s) are prevented from accessing database 400 for the period of time necessary to add, modify, or delete information within database 400. For example, in order to modify database record 430 within database 400, the group of database records 401 may be locked by an update thread to prevent the search threads from accessing database 400 while the update thread is modifying the information within database record 430. There are many well-known mechanisms for locking database 400 to prevent search access, including the use of spinlocks, semaphores, mutexes, etc. Additionally, various off-the-shelf commercial databases provide specific commands to lock all or parts of database 400, e.g., the lock table command in the Oracle 8 Database, manufactured by Oracle Corporation of Redwood Shores, Calif., etc.

Figure 5:
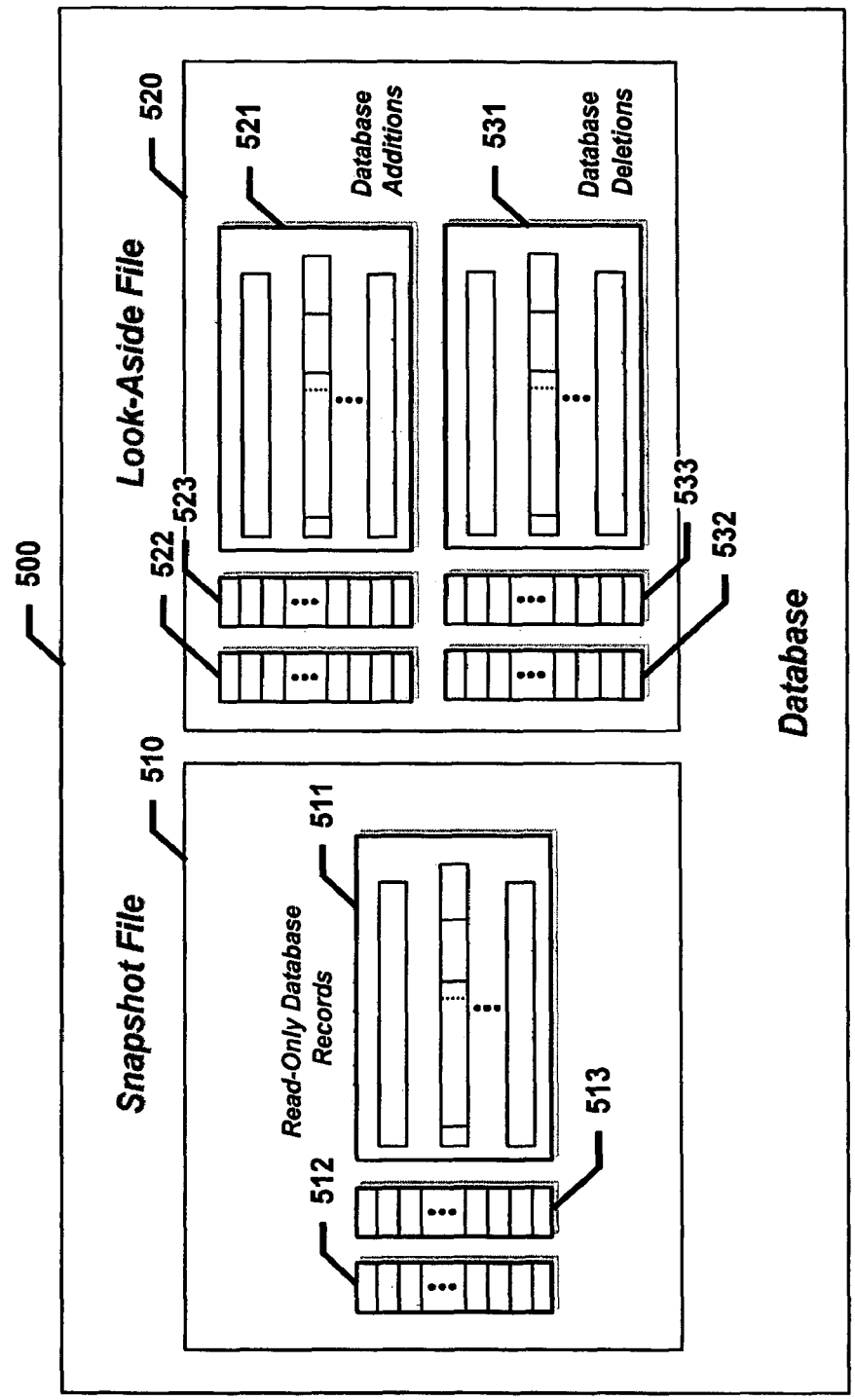
FIG. 5 is a detailed block diagram that illustrates a non-concurrency controlled data structure architecture, according to an embodiment of the present invention.

FIG. 5 is a block diagram that illustrates a general database architecture according to another embodiment of the present invention. In this embodiment, database 500 may include a highly-optimized, read-only, master snapshot file 510 and a growing, look-aside file 520. Master snapshot file 510 may include at least one table or group of database records 511, and at least one corresponding search index 512 with pointers (indices, direct byte-offsets, etc.) to individual records within the group of database records 511. Alternatively, master snapshot file 510 may include at least one hash table 513 as a search index with pointers (indices, direct byte-offsets, etc.) into the table or group of database records 511. Similarly, look-aside file 520 may include at least two tables or groups of database records, including database addition records 521 and database deletion records 531. Corresponding search indices 522 and 532 may be provided, with pointers (indices, direct byte-offsets, etc.) to individual records within the database addition records 521 and database deletion records 531. Alternatively, look-aside file 520 may include hash tables 523 and 533 as search indices, with pointers (indices, direct byte-offsets, etc.) into database addition records 521 and database deletion records 531, respectively.

System 100 may use various, well-known algorithms to search this data structure architecture for a given search term or key. In a typical example, look-aside file 520 may include all the recent changes to the data, and may be searched before read-only master snapshot file 510. If the search key is found in look-aside file 520, the response is returned without accessing snapshot file 510, but if the key is not found, then snapshot file 510 may be searched. However, when look-aside file 520 no longer fits in memory 104 with snapshot file 510, search query rates drop dramatically, by a factor of 10 to 50, or more, for example. Consequently, to avoid or minimize any drop in search query rates, snapshot file 510 may be periodically updated, or recreated, by incorporating all of the additions, deletions and modifications contained within look-aside file 520

Data within snapshot file 510 are not physically altered but logically added, modified or deleted. For example, data within snapshot file 510 may be deleted, or logically "forgotten," by creating a corresponding delete record within database deletion records 531 and writing a pointer to the delete record to the appropriate location in hash table 533. Data within snapshot file 510 may be logically modified by copying a data record from snapshot file 510 to a new data record within database addition records 521, modifying the data within the new entry, and then writing a pointer to the new entry to the appropriate hash table (e.g., hash table 522) or chain pointer within database addition records 521. Similarly, data within snapshot file 510 may be logically added to snapshot file 510 by creating a new data record within database addition records 521 and then writing a pointer to the new entry to the appropriate hash table (e.g., hash table 522) or chain pointer within database addition records 521.

In the DNS resolution embodiment, for example, snapshot file 510 may include domain name data and name server data, organized as separate data tables, or blocks, with separate search indices (e.g., 511-1, 511-2, 512-1, 512-2, 513-1, 513-2, etc., not shown for clarity). Similarly, look-aside file 520 may include additions and modifications to both the domain name data and the name server data, as well as deletions to both the domain name data and the name server data (e.g., 521-1, 521-2, 522-1, 522-2, 523-1, 523-2, 531-1, 531-2, 532-1, 532-2, 533-1, 533-2, etc., not shown for clarity).

Figure 6:
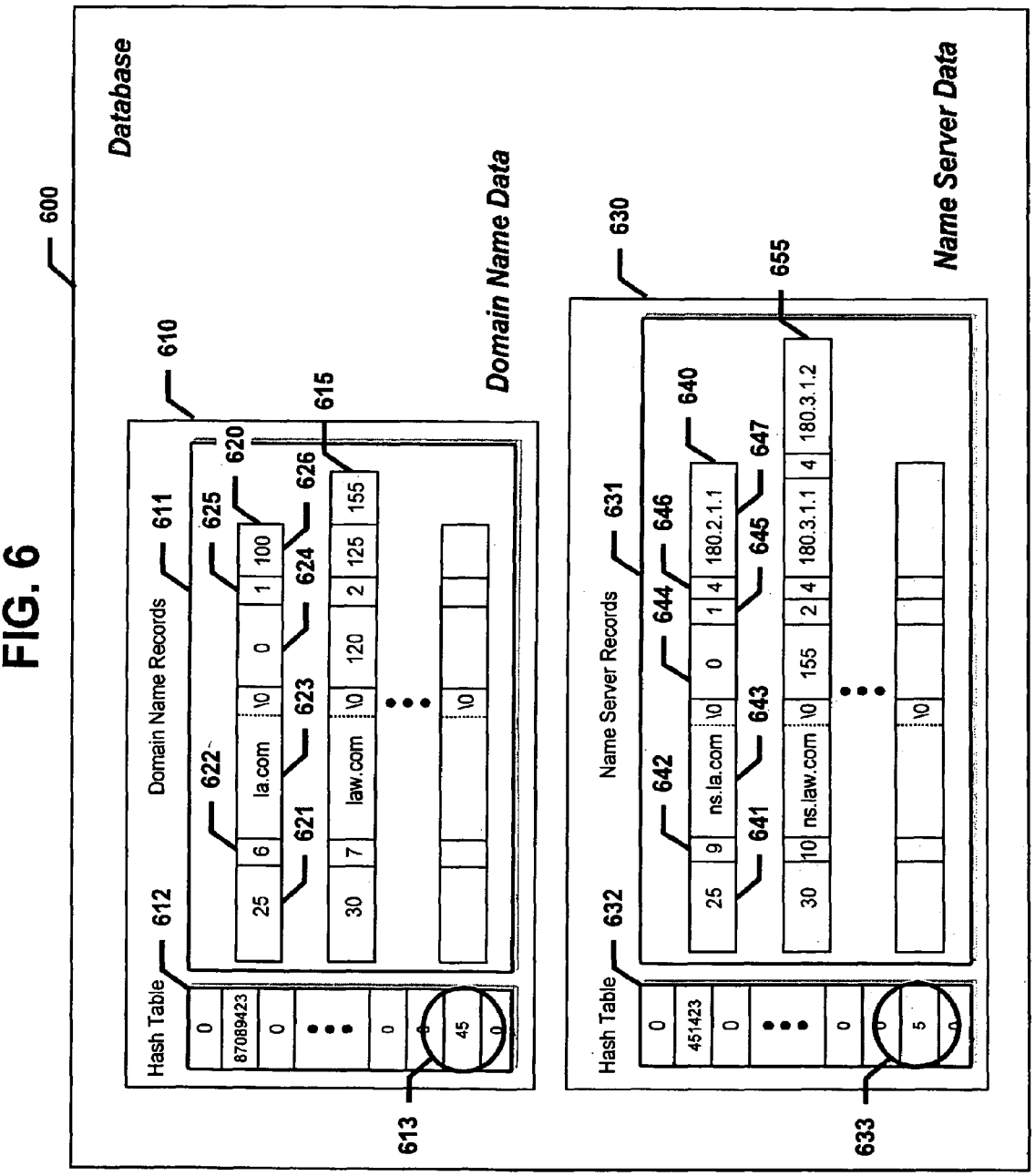
FIG. 6 is a detailed block diagram that illustrates a non-concurrency controlled data structure architecture, according to an embodiment of the present invention.

FIG. 6 is a detailed block diagram that illustrates a non-concurrency controlled data structure architecture, according to an embodiment of the present invention. Generally, database 600 may be organized into a single, searchable representation of the data. Data set updates may be continuously incorporated into database 600, and deletes or modifications may be physically performed on the relevant database records to free space within memory 104, for example, for subsequent additions or modifications. The single, searchable representation scales extremely well to large data set sizes and high search and update rates, and obviates the need to periodically recreate, propagate and reload snapshot files among multiple search engine computers.

In a DNS resolution embodiment, for example, database 600 may include domain name data 610 and name server data 620. Domain name data 610 and name server data 620 may include search indices with pointers (indices, direct byte-offsets, etc.) into blocks of variable length records. As discussed above, a hash function may map a search key to an integer value which may then be used as an index into a hash table. Similarly, hash buckets may be created for each hash table index using a singly-linked list of hash chain pointers. Domain name data 610 may include, for example, a hash table 612 as a search index and a block of variable-length domain name records 611. Hash table 612 may include an array of 8-byte pointers to individual domain name records 611, such as, for example, pointer 613 referencing domain name record 620. Variable-length domain name record 620 may include, for example, a next record offset 621, a name length 622, a normalized name 623, a chain pointer 624 (i.e., e.g., pointing to the next record in the hash chain), a number of name servers 625, and a name server pointer 626. The size of both chain pointer 624 and name server pointer 626 may be optimized to reflect the required block size for each particular type of data, e.g., eight bytes for chain pointer 624 and four bytes for name server pointer 626.

Name server data 630 may include, for example, a hash table 632 as a search index and a block of variable-length name server records 631. Hash table 632 may include an array of 4-byte pointers to individual name server records 631, such as, for example, pointer 633 referencing name server record 640. Variable-length name server record 640 may include, for example, a next record offset 641, a name length 642, a normalized name 643, a chain pointer 644 (i.e., e.g., pointing to the next record in the hash chain), a number of name server network addresses 645, a name server address length 646, and a name server network address 647, which may be, for example, an Internet Protocol (IP) network address. Generally, name server network addresses may be stored in ASCII (American Standard Code for Information Interchange, e.g., ISO-14962-1997, ANSI-X3.4-1997, etc.) or binary format; in this example, name server network address length 646 indicates that name server network address 647 is stored in binary format (i.e., four bytes). The size of chain pointer 644 may also be optimized to reflect the required name server data block size, e.g., four bytes.

Generally, both search indices, such as hash tables, and variable-length data records may be structured so that 8-byte pointers are located on 8-byte boundaries in memory. For example, hash table 612 may contain a contiguous array of 8-byte pointers to domain name records 611, and may be stored at a memory address divisible by eight (i.e., an 8-byte boundary, or 8N). Similarly, both search indices, such as hash tables, and variable-length data records may be structured so that 4-byte pointers are located on 4-byte boundaries in memory. For example, hash table 632 may contain a contiguous array of 4-byte pointers to name server records 631, and may be stored at a memory address divisible by four (i.e., a 4-byte boundary, or 4N). Consequently, modifications to database 600 may conclude by updating a pointer to an aligned address in memory using a single uninterruptible operation, including, for example writing a new pointer to the search index, such as a hash table, or writing a new hash chain pointer to a variable-length data record.

Figure 7:
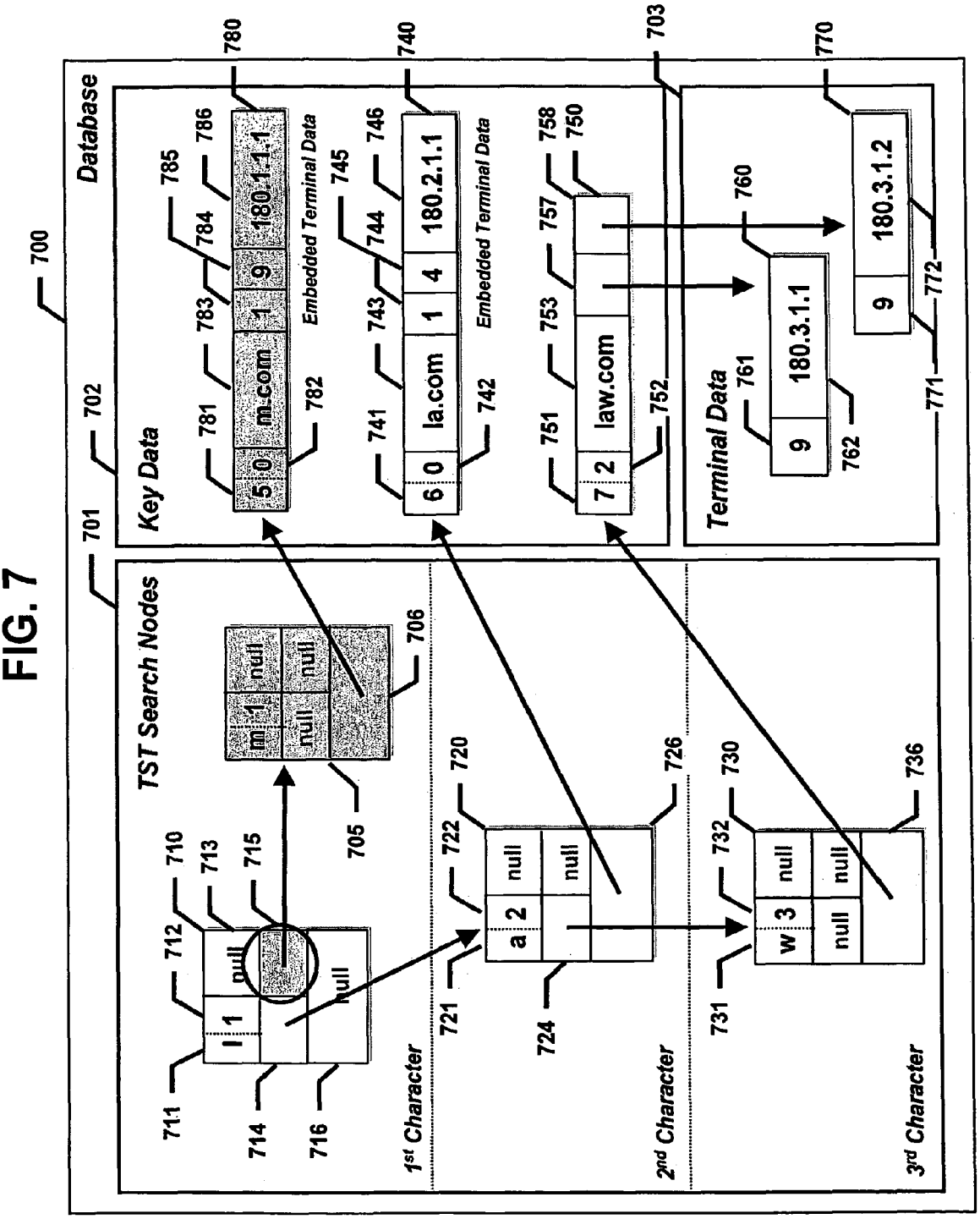
FIG. 7 is a detailed block diagram that illustrates a non-concurrency controlled data structure architecture, according to an embodiment of the present invention.

FIG. 7 is a detailed block diagram that illustrates a non-concurrency controlled data structure architecture, according to an embodiment of the present invention. Generally, database 700 may also be organized into a single, searchable representation of the data. Data set updates may be continuously incorporated into database 700, and deletes or modifications may be physically performed on the relevant database records to free space within memory 104, for example, for subsequent additions or modifications. The single, searchable representation scales extremely well to large data set sizes and high search and update rates, and obviates the need to periodically recreate, propagate and reload snapshot files among multiple search engine computers.

Many different physical data structure organizations are possible. An exemplary organization may use an alternative search index to hash tables for ordered, sequential access to the data records, such as the ternary search tree (trie), or TST, which combines the features of binary search trees and digital search tries. In a text-based applications, such as, for example, whois, domain name resolution using DNS Secure Extensions (Internet Engineering Taskforce Request for Comments: 2535), etc. TSTs advantageously minimize the number of comparison operations required to be performed, particularly in the case of a search miss, and may yield search performance metrics exceeding search engine implementations with hashing. Additionally, TSTs may also provide advanced text search features, such as, e.g., wildcard searches, which may be useful in text search applications, such as, for example, whois, domain name resolution, Internet content search, etc.

In an embodiment, a TST may contain a sequence of nodes linked together in a hierarchical relationship. A root node may be located at the top of the tree, related child nodes and links may form branches, and leaf nodes may terminate the end of each branch. Each leaf node may be associated with a particular search key, and each node on the path to the leaf node may contain a single, sequential element of the key. Each node in the tree contains a comparison character, or split value, and three pointers to other successive, or "child," nodes in the tree. These pointers reference child nodes whose split values are less than, equal to, or greater than the node's split value. Searching the TST for a particular key, therefore, involves traversing the tree from the root node to a final leaf node, sequentially comparing each element, or character position, of the key with the split values of the nodes along the path. Additionally, a leaf node may also contain a pointer to a key record, which may, in turn, contain at least one pointer to a terminal data record containing the record data associated with the key (e.g., an IP address). Alternatively, the key record may contain the record data in its entirety. Record data may be stored in binary format, ASCII text format, etc.

In an embodiment, database 700 may be organized as a TST, including a plurality of fixed-length search nodes 701, a plurality of variable-length key data records 702 and a plurality of variable-length terminal data records 703. Search nodes 701 may include various types of information as described above, including, for example, a comparison character (or value) and position, branch node pointers and a key pointer. The size of the node pointers may generally be determined by the number of nodes, while the size of the key pointers may generally be determined by the size of the variable-length key data set. Key data records 702 may contain key information and terminal data information, including, for example, pointers to terminal data records or embedded record data, while terminal data records 703 may contain record data.

In an embodiment, each fixed-length search node may be 24 bytes in length. Search node 710, for example, may contain an eight-bit comparison character (or byte value) 711, a 12-bit character (or byte) position 712, and a 12-bit node type/status (not shown for clarity); these data may be encoded within the first four bytes of the node. The comparison character 711 may be encoded within the first byte of the node as depicted in FIG. 7, or, alternatively, character position 712 may be encoded within the first 12 bits of the node in order to optimize access to character position 712 using a simple shift operation. The next 12 bytes of each search node may contain three 32-bit pointers, i.e., pointer 713, pointer 714 and pointer 715, representing "less than," "equal to," and "greater than" branch node pointers, respectively. These pointers may contain a counter, or node index, rather than a byte-offset or memory address. For fixed-length search nodes, the byte-offset may be calculated from the counter, or index value, and the fixed-length, e.g., counter*length. The final four bytes may contain a 40-bit key pointer 716, which may be a null value indicating that a corresponding key data record does not exist (shown) or a pointer to an existing corresponding key data record (not shown), as well as other data, including, for example, a 12-bit key length and a 12-bit pointer type/status field. Key pointer 716 may contain a byte offset to the appropriate key data record, while the key length may be used to optimize search and insertion when eliminating one-way branching within the TST. The pointer type/status field may contain information used in validity checking and allocation data used in memory management.

In an embodiment, key data record 750 may include, for example, a variable-length key 753 and at least one terminal data pointer. As depicted in FIG. 7, key data record 750 includes two terminal data pointers: terminal data pointer 757 and terminal data pointer 758. Key data record 750 may be prefixed with a 12-bit key length 751 and a 12-bit terminal pointer count/status 752, and may include padding (not shown for clarity) to align the terminal data pointer 757 and terminal data pointer 758 on an eight-byte boundary in memory 104. Terminal data pointer 757 and terminal data pointer 758 may each contain various data, such as, for example, terminal data type, length, status or data useful in binary record searches. Terminal data pointer 757 and terminal data pointer 758 may be sorted by terminal data type for quicker retrieval of specific resource records (e.g., terminal data record 760 and terminal data record 770). In another embodiment, key data record 740 may include embedded terminal data 746 rather than, or in addition to, terminal data record pointers. For example, key data record 740 may include a key length 741, a terminal pointer count 742, a variable-length key 743, the number of embedded record elements 744, followed by a record element length 745 (in bytes, for example) and embedded record data 746 (e.g., a string, a byte sequence, etc.) for each of the number of embedded record elements 744.

In an embodiment, terminal data record 760, for example, may include a 12-bit length 761, a 4-bit status, and a variable-length string 762 (e.g., an IP address). Alternatively, variable length string 762 may be a byte sequence. Terminal data record 760 may include padding to align each terminal data record to an 8-byte boundary in memory 104. Alternatively, terminal data record 760 may include padding to a 4-byte boundary, or, terminal data record 760 may not include any padding. Memory management algorithms may determine, generally, whether terminal data records 760 are padded to 8-byte, 4-byte, or 0-byte boundaries. Similarly, terminal data record 770 may include a 12-bit length 771, a 4-bit status, and a variable-length string 772 (e.g., an IP address).

Generally, both search indices, such as TSTs, and data records may be structured so that 8-byte pointers are located on 8-byte boundaries in memory. For example, key pointer 726 may contain an 8-byte (or less) pointer to key data record 740, and may be stored at a memory address divisible by eight (i.e., an 8-byte boundary, or 8N). Similarly, both search indices, such as TSTs, and data records may be structured so that 4-byte pointers are located on 4-byte boundaries in memory. For example, node branch pointer 724 may contain a 4-byte (or less) pointer to node 730, and may be stored at a memory address divisible by four (i.e., a 4-byte boundary, or 4N). Consequently, modifications to database 700 may conclude by updating a pointer to an aligned address in memory using a single uninterruptible operation, including, for example writing a new pointer to the search index, such as a TST node, or writing a new pointer to a data record.

Figure 8:
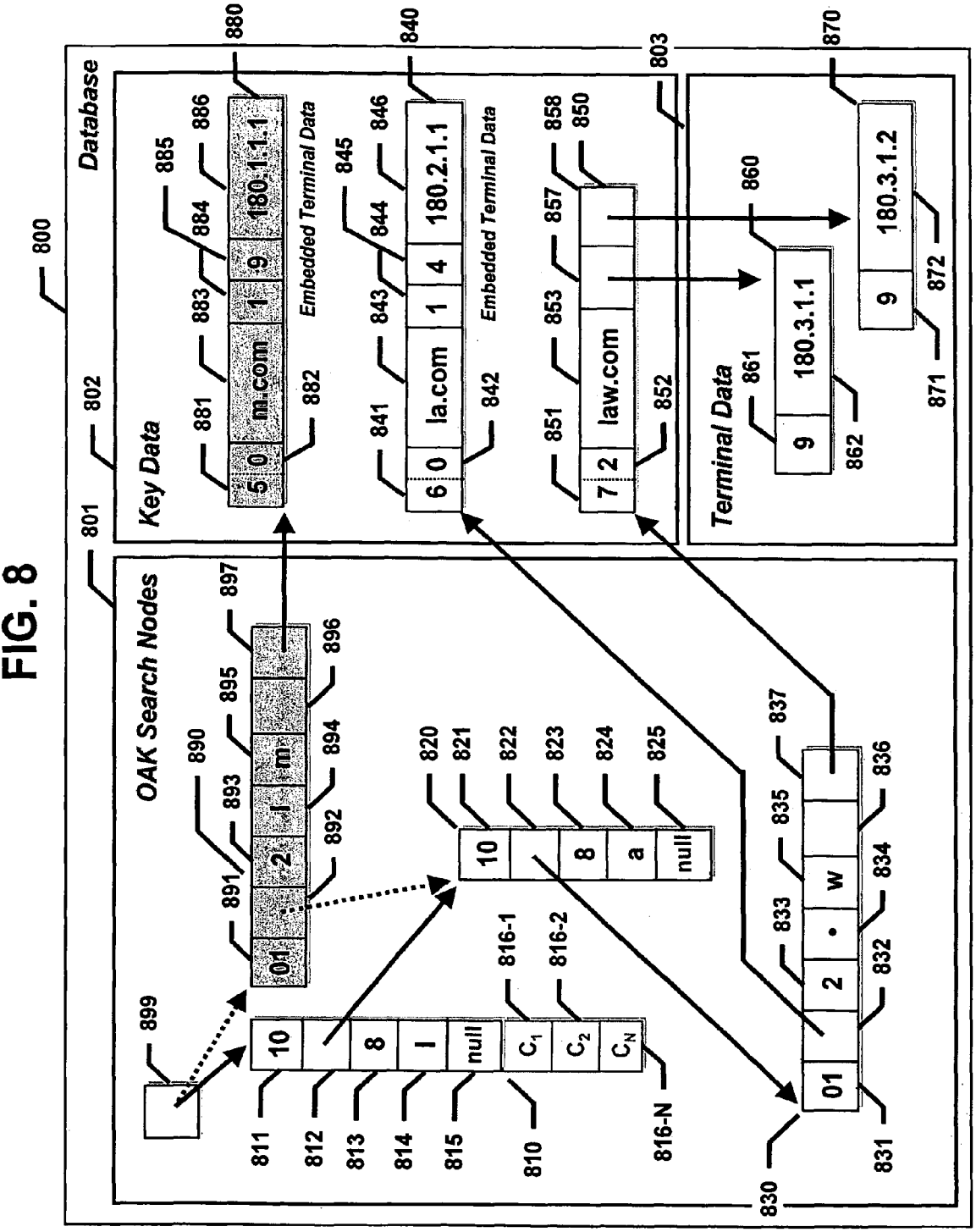
FIG. 8 is a detailed block diagram that illustrates a non-concurrency controlled data structure architecture, according to an embodiment of the present invention.

FIG. 8 is a detailed block diagram that illustrates another data structure architecture, according to an embodiment of the present invention. As above, database 800 may also be organized into a single, searchable representation of the data. Data set updates may be continuously incorporated into database 800, and deletes or modifications may be physically performed on the relevant database records to free space within memory 104, for example, for subsequent additions or modifications. The single, searchable representation scales extremely well to large data set sizes and high search and update rates, and obviates the need to periodically recreate, propagate and reload snapshot files among multiple search engine computers.

Other search index structures are possible for accessing record data, In an embodiment, database 800 may use an alternative ordered search index, organized as an ordered access key tree (i.e., "OAK tree"). Database 800 may include, for example, a plurality of variable-length search nodes 801, a plurality of variable-length key records 802 and a plurality of variable-length terminal data records 803. Search nodes 801 may include various types of information as described above, such as, for example, search keys, pointers to other search nodes, pointers to key records, etc. In an embodiment, plurality of search nodes 801 may include vertical and horizontal nodes containing fragments of search keys (e.g., strings), as well as pointers to other search nodes or key records. Vertical nodes may include, for example, at least one search key, or character, pointers to horizontal nodes within the plurality of search nodes 801, pointers to key records within the plurality of key records 802, etc. Horizontal nodes may include, for example, at least two search keys, or characters, pointers to vertical nodes within the plurality of search nodes 801, pointers to horizontal nodes within the plurality of search nodes 801, pointers to key records within the plurality of key records 802, etc. Generally, vertical nodes may include a sequence of keys (e.g., characters) representing a search key fragment (e.g., string), while horizontal nodes may include various keys (e.g., characters) that may exist at a particular position within the search key fragment (e.g., string).

In an embodiment, plurality of search nodes 801 may include vertical node 810, vertical node 820 and horizontal node 830. Vertical node 810 may include, for example, a 2-bit node type 811 (e.g., "10"), a 38-bit address 812, an 8-bit length 813 (e.g., "8"), an 8-bit first character 814 (e.g., "l") and an 8-bit second character 815 (e.g., "null"). In this example, address 812 may point to the next node in the search tree, i.e., vertical node 820. In an embodiment, 38-bit address 812 may include a 1-bit terminal/nodal indicator and a 37-bit offset address to reference one of the 8-byte words within a 1 Tbyte (~$10^{12}$ byte) address space of memory 104. Accordingly, vertical node 810 may be eight bytes (64 bits) in length, and, advantageously, may be located on an 8-byte word boundary within memory 104. Generally, each vertical node within plurality of search nodes 801 may be located on an 8-byte word boundary within memory 104.

A vertical node may include a multi-character, search key fragment (e.g., string). Generally, search keys without associated key data records may be collapsed into a single vertical node to effectively reduce the number of vertical nodes required within plurality of search nodes 801. In an embodiment, vertical node 810 may include eight bits for each additional character, above two characters, within the search key fragment, such as, for example, 8-bit characters 816-1, 816-2 . . . 816-N (shown in phantom outline). Advantageously, vertical node 810 may be padded to a 64-bit boundary within memory 104 in accordance with the number of additional characters located within the string fragment. For example, if nine characters are to be included within vertical node 810, then characters one and two may be assigned to first character 814 and second character 815, respectively, and 56 bits of additional character information, corresponding to characters three through nine, may be appended to vertical node 810. An additional eight bits of padding may be included to align the additional character information on an 8-byte word boundary.

Similarly, vertical node 820 may include, for example, a 2-bit node type 821 (e.g., "10"), a 38-bit address 822, an 8-bit length 823 (e.g., "8"), an 8-bit first character 824 (e.g., "a") and an 8-bit second character 825 (e.g., "null"). In this example, address 822 may point to the next node in the search tree, i.e., horizontal node 830. Accordingly, vertical node 820 may be eight bytes in length, and, advantageously, may be located on an 8-byte word boundary within memory 104. Of course, additional information may also be included within vertical node 820 if required, as described above with reference to vertical node 810.

Horizontal node 830 may include, for example, a 2-bit node type 831 (e.g., "01"), a 38-bit first address 832, an 8-bit address count 833 (e.g., 2), an 8-bit first character 834 (e.g., "*"), an 8-bit last character 835 (e.g., "w"), a variable-length bitmap 836 and a 38-bit second address 837. In this example, first character 834 may include a single character, "*" representing the search key fragment "la" defined by vertical nodes 810 and 820, while last character 831 may include a single character "w," representing the search key fragment "law" defined by vertical nodes 810 and 820, and the last character 835 of horizontal node 830. First address 832 may point to key data record 840, associated with the search key fragment "la," while second address 837 may point to key data record 850 associated with the search key fragment "law."

Bitmap 836 may advantageously indicate which keys (e.g., characters) are referenced by horizontal node 830. A "1" within a bit position in bitmap 836 indicates that the key, or character, is referenced by horizontal node 830, while a "0" within a bit position in bitmap 836 may indicate that the key, or character, is not referenced by horizontal node 830. Generally, the length of bitmap 836 may depend upon the number of sequential keys, or characters, between first character 834 and last character 835, inclusive of these boundary characters. For example, if first character 834 is "a" and last character 835 is "z," then bitmap 836 may be 26 bits in length, where each bit corresponds to one of the characters between, and including, "a" through "z." In this example, additional 38-bit addresses would be appended to the end of horizontal node 830, corresponding to each of the characters represented within bitmap 836. Each of these 38-bit addresses, as well as bitmap 836, may be padded to align each quantity on an 8-byte word boundary within memory 104. In an embodiment, the eight-bit ASCII character set may be used as the search key space so that bitmap 836 may be as long as 256 bits (i.e., $2^8$ bits or 32 bytes). In the example depicted in FIG. 8, due to the special reference character "*" and address count 833 of "2," bitmap 836 may be two bits in length and may include a "1" in each bit position corresponding to last character 835.

In an embodiment, and as discussed with reference to key data record 750 (FIG. 7), key data record 850 may include, for example, a variable-length key 853 and at least one terminal data pointer. As depicted in FIG. 8, key data record 850 includes two terminal data pointers, terminal data pointer 857 and terminal data pointer 858. Key data record 850 may be prefixed with a 12-bit key length 851 and a 12-bit terminal pointer count/status 852, and may include padding (not shown for clarity) to align the terminal data pointer 857 and terminal data pointer 858 on an 8-byte boundary in memory 104. Terminal data pointer 857 and terminal data pointer 858 may each contain a 10-bit terminal data type and other data, such as, for example, length, status or data useful in binary record searches. Terminal data pointer 857 and terminal data pointer 858 may be sorted by terminal data type for quicker retrieval of specific resource records (e.g., terminal data record 860 and terminal data record 870).

In another embodiment, and as discussed with reference to key data record 740 (FIG. 7), key data record 840 may include embedded terminal data 846 rather than a terminal data record pointer. For example, key data record 840 may include a key length 841, a terminal pointer count 842, a variable-length key 843, the number of embedded record elements 844, followed by a record element length 845 (in bytes, for example) and embedded record data 846 (e.g., a string, a byte sequence, etc.) for each of the number of embedded record elements 844.

In another embodiment, and as discussed with reference to terminal data record 760 (FIG. 7), terminal data record 860, for example, may include a 12-bit length 861, a 4-bit status, and a variable-length string 862 (e.g., an IP address). Alternatively, variable length string 862 may be a byte sequence. Terminal data record 860 may include padding (not shown for clarity) to align each terminal data record to an 8-byte boundary in memory 104. Alternatively, terminal data record 860 may include padding (not shown for clarity) to a 4-byte boundary, or, terminal data record 860 may not include any padding. Memory management algorithms may determine, generally, whether terminal data records 760 are padded to 8-byte, 4-byte, or 0-byte boundaries. Similarly, terminal data record 870 may include a 12-bit length 871, a 4-bit status, and a variable-length string 872 (e.g., an IP address).

Generally, both search indices, such as OAK trees, and data records may be structured so that 8-byte pointers are located on 8-byte boundaries in memory. For example, vertical node 810 may contain an 8-byte (or less) pointer to vertical node 820, and may be stored at a memory address divisible by eight (i.e., an 8-byte boundary, or 8N). Similarly, both search indices, such as OAK trees, and data records may be structured so that 4-byte pointers are located on 4-byte boundaries in memory. Consequently, modifications to database 800 may conclude by updating a pointer to an aligned address in memory using a single uninterruptible operation, including, for example writing a new pointer to the search index, such as an OAK trees node, or writing a new pointer to a data record.

The various embodiments discussed above with reference to FIG. 8 present many advantages. For example, an OAK tree data structure is extremely space efficient and 8-bit clean. Regular expression searches may be used to search vertical nodes containing multi-character string fragments, since the 8-bit first character (e.g., first character 814), the 8-bit second character (e.g., second character 8-15) and any additional 8-bit characters (e.g., additional characters 816-1 . . . 816-N) may be contiguously located within the vertical node (e.g., vertical node 810). Search misses may be discovered quickly, and, no more than N nodes may need to be traversed to search for an N-character length search string.

Figure 9:
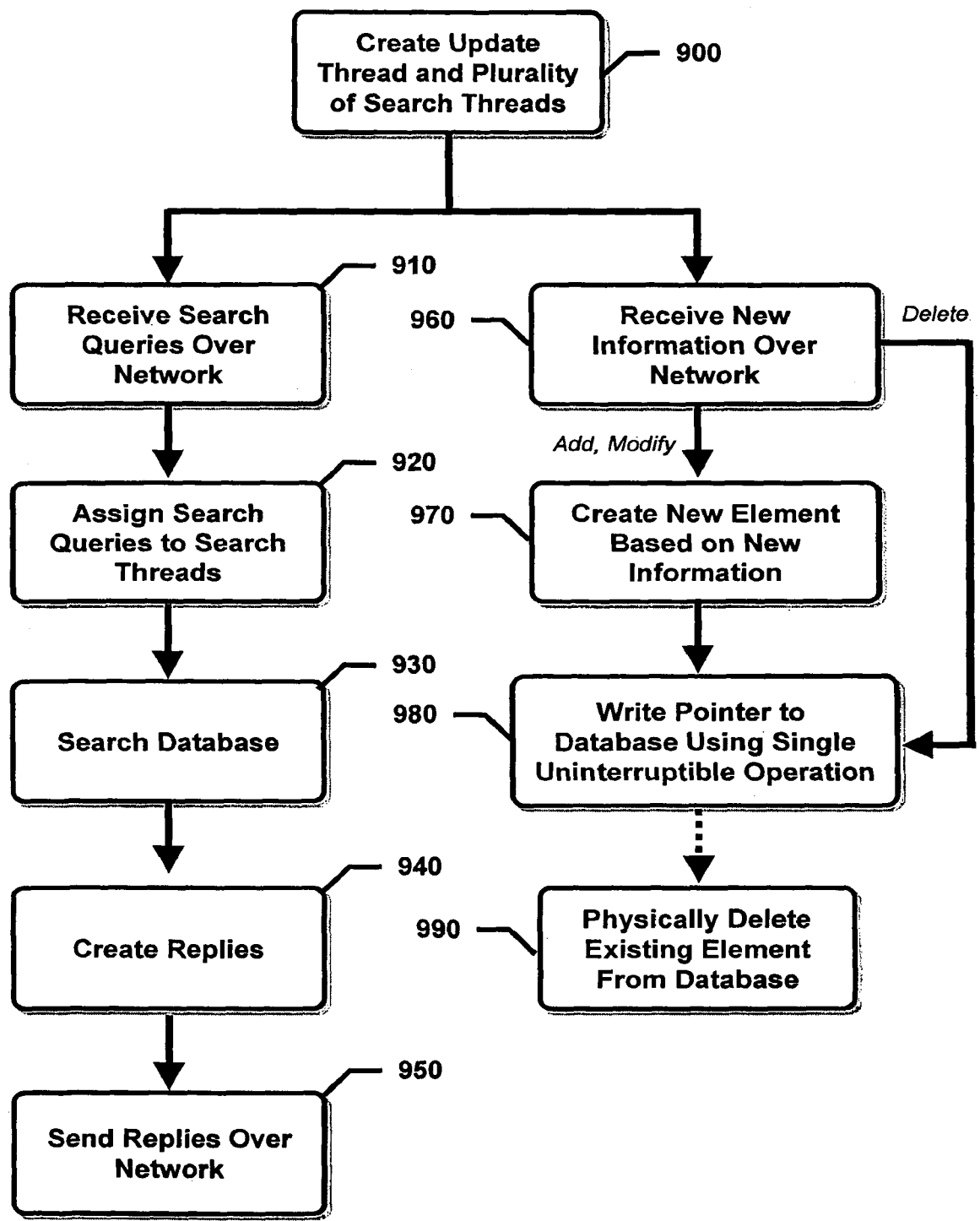
FIG. 9 is a top level flow diagram that illustrates a method for searching and concurrently updating a database without the use of database locks or access controls, according to an embodiment of the present invention.

FIG. 9 is a top level flow diagram that illustrates a method for searching and concurrently updating a database without the use of database locks or access controls, according to embodiments of the present invention.

An update thread and a plurality of search threads may be created (900). In an embodiment, system 100 may spawn a single update thread to incorporate updates to the local database received, for example, from OLTP server 140-1 over WAN 124. In other embodiments, system 100 may receive updates from OLTP servers 140-1 . . . 140-S over WAN 124, and from plurality of network computers 120-1 . . . 120-N over WAN 124 or LAN 122. System 100 may also spawn a search thread in response to each session request received from the plurality of network computers 120-1 . . . 120-N. For example, a manger thread may poll one or more control ports, associated with one or more network interfaces 114-1 . . . 114-O, for session requests transmitted from the plurality of network computers 120-1 . . . 120-N. Once a session request from a particular network computer 120-1 . . . 120-N is received, the manage thread may spawn a search thread and associate the search thread with that particular network computer (e.g., PE).

In an alternative embodiment, system 100 may spawn a number of search threads without polling for session requests from the plurality of network computers 120-1 . . . 120-N. In this embodiment, the search threads may not be associated with particular network computers and may be distributed evenly among the plurality of processors 102-1 . . . 102-P. Alternatively, the search threads may execute on a subset of the plurality of processors 102-1 . . . 102-P. The number of search threads may not necessarily match the number of network computers (e.g., N).

A plurality of search queries may be received (910) over the network. In an embodiment, plurality of network computers 120-1 . . . 120-N may send the plurality of search queries to system 100 over LAN 122, or, alternatively, WAN 124. The plurality of search queries may contain, for example, a search term or key, as well as state information that may be associated with each query (e.g., query source address, protocol type, etc.). State information may be explicitly maintained by system 100, or, alternatively, a state information handle may be provided. In a preferred embodiment, each of the plurality of network computers 120-1 . . . 120-N may multiplex a predetermined number of search queries into a single network packet for transmission to system 100 (e.g., a Request SuperPacket 220 as depicted in FIG. 2).

Each search query may be assigned (920) to one of the search threads for processing. In an embodiment, each search thread may be associated with one of the plurality of network computers 120-1 . . . 120-N and all of the search queries received from that particular network computer may be assigned (920) to the search thread. In other words, one search thread may process all of the search queries arriving from a single network computer (e.g., a single PE). In an embodiment, each search thread may extract individual search queries from a single, multiplexed network packet (e.g., Request SuperPacket 220 as depicted in FIG. 2), or, alternatively, the extraction may be performed by a different process or thread.

In another embodiment, the search queries received from each of the plurality of network computers 120-1 . . . 120-N may be assigned (920) to different search threads. In this embodiment, the multi-thread assignment may be based on an optimal distribution function which may incorporate various system parameters including, for example, processor loading. Of course, the assignment of search queries to search threads may change over time, based upon various system parameters, including processor availability, system component performance, etc. Various mechanisms may be used to convey search queries to assigned search threads within system 100, such as, for example, shared memory, inter-process messages, tokens, semaphores, etc.

Each search thread may search (930) the database based on the assigned search queries. Searching the database may depend upon the underlying structure of the database.

Referring to the database embodiment illustrated in FIG. 4, database 400 may be searched (930) for the search key. The data record (e.g., database record 420) corresponding to the search key may then be determined. Referring to the database embodiment illustrated in FIG. 5, look-aside file 520 may first be searched (930) for the search key, and, if a match is not determined, then snapshot file 510 may be searched (930). The data record corresponding to the search key may then be determined.

Referring to the database embodiment illustrated in FIG. 6, domain name data 610 may first be searched (930) for the search key, and then the resource data within name server data 630, corresponding to the search key, may then be determined. For example, for the "la.com" search key, a match may be determined with domain name record 620 in domain name data 610. The appropriate information may be extracted, including, for example, name server pointer 626. Then, the appropriate name server record 640 may be indexed using name server pointer 626, and name server network address 647 may be extracted.

Referring to the database embodiment illustrated in FIG. 7, the TST may be searched (930) for the search key, from which the resource data may be determined. For example, for the "law.com" search key, search nodes 701 may be searched (930), and a match determined with node 730. Key pointer 736 may be extracted, from which the key data record 750 may be determined. The number of terminal data pointers 752 may then be identified and each terminal data pointer may be extracted. For example, terminal data pointer 757 may reference terminal data record 760 and terminal data pointer 758 may reference and terminal data record 770. The variable-length resource data, e.g., name server network address 762 and name server network address 772, may then be extracted from each terminal data record using the length 761 and 771, respectively.

Referring to the database embodiment illustrated in FIG. 8, the OAK tree may be searched (930) for the search key, from which the resource data may be determined. For example, for the "law.com" search key, search nodes 801 may be searched (930), and a match determined with node 830. Second address 837 may be extracted, from which the key data record 850 may be determined. The number of terminal data pointers 852 may then be identified and each terminal data pointer may be extracted. For example, terminal data pointer 857 may reference terminal data record 860 and terminal data pointer 858 may reference and terminal data record 870. The variable-length resource data, e.g., name server network address 862 and name server network address 872, may then be extracted from each terminal data record using the length 861 and 871, respectively.

Each search thread may create (940) a plurality of search replies corresponding to the assigned search queries. If a match is not found for a particular search key, the reply may include an appropriate indication, such as, for example the null character. For domain name resolution, for example, a search key might be "law.com" and the corresponding resource data might be "180.1.1.1". More than one name server network address may be associated with a search key, in which case, more than one name server network address may be determined.

The replies may be sent (950) over the network. In an embodiment, each search thread may multiplex the appropriate replies into a single network packet (e.g., Response SuperPacket 240) corresponding to the single network packet containing the original queries (e.g., Request SuperPacket 220). Alternatively, a different process or thread may multiplex the appropriate replies into the single network packet. The response network packet may then be sent (950) to the appropriate network computer within the plurality of network computers 120-1 . . . 120-N via LAN 122, or alternatively, WAN 124. In one embodiment, the response packets may be sent to the same network computer from which the request packets originated, while in another embodiment, the response packets may be sent to a different network computer.

The update thread may receive (960) new information over the network. In an embodiment, new information may be sent, for example, from OLTP server 140-1 to system 100 over WAN 124. In other embodiments, system 100 may receive updates from OLTP servers 140-1 . . . 140-S over WAN 124, and from plurality of network computers 120-1 . . . 120-N over WAN 124 or LAN 122. In the DNS resolution embodiment, for example, the new information may include new domain name data, new name server data, a new name server for an existing domain name, etc. Alternatively, the new information may indicate that a domain name, name server, name server network address, etc., may be deleted from the database. Generally, any information contained within the database may be added, modified or deleted, as appropriate.

The update thread may create (970) a new element in the database containing the new information. Generally, modifications to information contained within an existing element of the database are incorporated by creating a new element based on the existing element and then modifying the new element to include the new information. During this process, the new element may not be visible to the search threads or processes currently executing on system 100 until the new element has been committed to the database. Generally, additions to the database may be accomplished in a similar fashion, without necessarily using information contained within an existing element. In one embodiment, the deletion of an existing element from the database may be accomplished by adding a new, explicit "delete" element to the database. In another embodiment, the deletion of an existing element from the database may be accomplished by overwriting a pointer to the existing element with an appropriate indicator (e.g., a null pointer, etc.). In this embodiment, the update thread does not create a new element in the database containing new information.

In the DNS resolution embodiment, for example, the new information may include a new domain name to be added to the database. In this example, for simplicity, the new domain name may reference an existing name server. Referring to FIG. 6, memory space for a new domain name record 615 may be allocated from a memory pool associated with the domain name records 611, or, alternatively, from a general memory pool associated with domain name data 610. The new domain name may be normalized and copied to the new domain name record 615, and a pointer to an existing name server (e.g., name server record 655) may be determined and copied to the new domain name record 615. Other information may be calculated and added to new domain name record 615, such as, for example, a number of name servers, a chain pointer, etc. In more complicated examples, the new information may include a new search key with corresponding resource data.

Referring to FIG. 7, a new search node 705, as well as a new key data record 780, may first be created. In this example, the new search node 705 may include a comparison character ("m"), in the first position, that is greater than the comparison character ("l"), in the first position, of existing search node 710. Consequently, search node 705 may be inserted in the TST at the same "level" (i.e., $1^{st}$ character position) as search node 710. Before search node 705 is committed to the database, the 4-byte "greater than" pointer 715 of search node 710 may contain a "null" pointer. Search node 705 may also include a 4-byte key pointer 706 which may contain a 40-bit pointer to the new key data record 780. Key data record 780 may include a key length 781 (e.g., "5") and type 782 (e.g., indicating embedded resource data), a variable length key 783 (e.g., "m.com"), a number of embedded resources 784 (e.g., "1"), a resource length 785 (e.g., "9"), and a variable-length resource string 786 or byte sequence (e.g., "180.1.1.1"). In an embodiment, memory space may be allocated for search node 705 from a memory pool associated with TST nodes 701, while memory space may be allocated for the key data record 770 from a memory pool associated with plurality of key data records 702.

Referring to FIG. 8, a new search node 890, as well as a new key data record 880, may first be created. In this example, the new search node 890 may be a horizontal node including, for example, a 2-bit node type 891 (e.g., "01"), a 38-bit first address 892, an 8-bit address count 893 (e.g., 2), an 8-bit first character 894 (e.g., "l"), an 8-bit last character 895 (e.g., "m"), a variable-length bitmap 896 and a 38-bit second address 897. First address 892 may point to vertical node 820, the next vertical node in the "l . . . " search string path, while second address 897 may point to key data record 880 associated with the search key fragment "m." Key data record 880 may include a key length 881 (e.g., "5") and type 882 (e.g., indicating embedded resource data), a variable length key 883 (e.g., "m.com"), a number of embedded resources 884 (e.g., "1"), a resource length 885 (e.g., "9"), and a variable-length resource string 886 or byte sequence (e.g., "180.1.1.1"). In an embodiment, memory space may be allocated for search node 890 from a memory pool associated with plurality of search nodes 801, while memory space may be allocated for key data record 880 from a memory pool associated with plurality of key data records 802.

The update thread may write (980) a pointer to the database using a single uninterruptible operation. Generally, a new element may be committed to the database, (i.e., become visible to the search threads, or processes), instantaneously by writing a pointer to the new element to the appropriate location within the database. As discussed above, the appropriate location may be aligned in memory, so that the single operation includes a single store instruction of an appropriate length. In an embodiment, an existing element may be deleted from the database (i.e., become invisible to the search threads, or processes) by instantaneously overwriting a pointer to the existing element with an appropriate indicator (e.g., a "null" pointer, etc.). Again, the appropriate location may be aligned in memory, so that the single operation includes a single store instruction of an appropriate length.

Referring to FIG. 6, an 8-byte pointer corresponding to domain name record 620 may be written to hash table 612 (e.g., element 613). Importantly, the hash table entries are aligned on 8-byte boundaries in memory 104 to ensure that a single, 8-byte store instruction is used to update this value. Referring to FIG. 7, a 4-byte pointer corresponding to the new search node 705 may be written to the 4-byte "greater-than" node pointer 715 within search node 710. Importantly, the node pointer 715 is aligned on a 4-byte boundary in memory 104 to ensure that a single, 4-byte store instruction may be used to update this value. Referring to FIG. 8, plurality of search nodes 801 may also include a top-of-tree address 899, which may be aligned on an 8-byte word boundary in memory 104 and reference the first node within plurality of search nodes 801 (i.e., e.g., vertical node 810). An 8-byte pointer corresponding to the new search node 890 may be written to the top-of-tree address 899 using a single store instruction. In each of these embodiments, just prior to the store instruction, the new data are not visible to the search threads, while just after the store instruction, the new data are visible to the search threads. Thus, with a single, uninterruptible operation, the new data may be committed to the database without the use of database locks or access controls.

In an embodiment, the update thread may physically delete (990) an existing element after the pointer is written (980) to the database. Advantageously, for existing elements of the database that are modified or deleted, the physical deletion of these elements from memory 104 may be delayed to preserve consistency of in-progress searches. For example, after an existing element has been modified and the corresponding new element committed to the database, the physical deletion of the existing element from memory 104 may be delayed so that existing search threads that have a result, acquired just before the new element was committed to the database, may continue to use the previous state of the data. Similarly, after an existing element has been deleted from the database, the physical deletion of the existing element from memory 104 may be delayed so that existing search threads that have a result, acquired just before the existing element was deleted from the database, may continue to use the previous state of the data. The update thread may physically delete (990) the existing element after all the search threads that began before the existing element was modified, or deleted, have finished.

Potential complications may arise from the interaction of methods associated with embodiments of the present invention and various architectural characteristics of system 100. For example, the processor on which the update thread is executing (e.g., processor 102-1, 102-2, etc.) may include hardware to support out-of-order instruction execution. In another example, system 100 may include an optimizing compiler which may produce a sequence of instructions, associated with embodiments of the present invention, that have been optimally rearranged to exploit the parallelism of the processor's internal architecture (e.g., processor 102-1, 102-2, etc.). Many other complications may readily be admitted by one skilled in the art. Data hazards arising from out-of-order instruction execution may be eliminated, for example, by creating dependencies between the creation (970) of the new element and the pointer write (980) to the database.

In one embodiment, these dependencies may be established by inserting additional arithmetic operations, such as, for example, an exclusive OR (XOR) instruction, into the sequence of instructions executed by processor 102-1 to force the execution of the instructions associated with the creation (970) of the new element to issue, or complete, before the execution of the pointer write (980) to the database. For example, the contents of the location in memory 104 corresponding to the new element may be XOR'ed with the contents of the location in memory 104 corresponding to the pointer to the new element. Subsequently, the address of the new element may be written (980) to memory 104 to commit the new element to the database. Numerous methods to overcome these complications may be readily discernable to one skilled in the art.

Several embodiments of the present invention are specifically illustrated and described herein. However, it will be appreciated that modifications and variations of the present invention are covered by the above teachings and within the purview of the appended claims without departing from the spirit and intended scope of the invention.

What is claim is:

1. In a system comprising a first back-end lookup computer and a plurality of protocol computers, a method comprising:
    at a first of the plurality of protocol computers:
        receiving a plurality of DNS queries;
        multiplexing the plurality of DNS queries and state information associated with each of the plurality of DNS query into a first single communication;
        sending the first single communication to the first back-end lookup computer, wherein the first back-end lookup computer is configured to receive multiplexed DNS queries and to search a single database using the first single communication including the plurality of DNS queries that are multiplexed;
        receiving a second single communication from the first back-end lookup computer;
        retrieving a plurality of DNS responses by de-multiplexing the second single communication, wherein each of the plurality of DNS responses corresponds to one of the plurality of DNS queries; and
        transmitting the plurality of DNS responses; and
    at the first back-end lookup computer:
        de-multiplexing the first single communication received from the first of the plurality of protocol computers into the plurality of DNS queries;
        constructing a DNS response to each of the plurality of DNS queries by searching the single database using each of the plurality of DNS queries;
        multiplexing the DNS responses into the second single communication;
        sending the second single communication to the first of the plurality of protocol computers;

receiving an update to the single database from the first of the plurality of protocol computers; and updating the single database using the update, wherein the update is packaged in the first single communication.

2. The method of claim 1, further comprising, at the first of the plurality of protocol computers:

selecting the first back-end lookup computer from a plurality of back-end lookup computers, based on an ability of each of the plurality of back-end lookup computers to provide responses to the plurality of DNS queries received by the first of the plurality of protocol computers.

3. The method of claim 1, further comprising, at the first of the plurality of protocol computers:

maintaining the state information associated with each of the plurality of DNS queries that is received; and for each of the plurality of DNS queries, including a reference to the state information in the first single communication sent to the back-end lookup computer.

4. The method of claim 1, wherein the state information associated with each of the plurality of DNS queries comprises at least one of: a source address or a protocol type.

5. A system, comprising:

a first back-end lookup computer; and a plurality of protocol computers comprising a first of the plurality of protocol computers, wherein the first of the plurality of protocol computers includes a processor and a memory system, wherein the memory system includes one or more non-transitory computer readable media storing instructions that, when executed by the processor, are configured to cause the first of the plurality of protocol computers to perform first operations, the first operations comprising:

receiving a plurality of DNS queries;

multiplexing the plurality of DNS queries and state information associated with each of the plurality of DNS query into a first single communication;

sending the first single communication to the first back-end lookup computer, wherein the first back-end lookup computer is configured to receive multiplexed DNS queries and to search a single database using the first single communication including the plurality of DNS queries that are multiplexed;

receiving a second single communication from the first back-end lookup computer;

retrieving a plurality of DNS responses by de-multiplexing the second single communication, wherein each of the plurality of DNS responses corresponds to one of the plurality of DNS queries; and transmitting the plurality of DNS responses, and wherein the first back-end lookup computer comprises a processor and a memory system, wherein the memory system of the first back-end lookup computer comprises one or more non-transitory computer readable media storing instructions that, when executed by the processor of the first back-end lookup computer, cause the first back-end lookup computer to perform second operations, the second operations comprising:

de-multiplexing the first single communication received from the first of the plurality of protocol computers into the plurality of DNS queries;

constructing a DNS response to each of the plurality of DNS queries by searching the single database using each of the plurality of DNS queries;

multiplexing the DNS responses into the second single communication;

sending the second single communication to the first of the plurality of protocol computers;

receiving an update to the single database from the first of the plurality of protocol computers; and updating the single database using the update, wherein the update is packaged in the first single communication.

6. The system of claim 5, wherein the first operations further comprise:

selecting the first back-end lookup computer from a plurality of back-end lookup computers, based on an ability of each of the plurality of back-end lookup computers to provide responses to the plurality of DNS queries received by the first of the plurality of protocol computers.

7. The system of claim 5, wherein the first operations further comprise:

maintaining the state information associated with each of the plurality of DNS queries that is received; and for each of the plurality of DNS queries, including a reference to the state information in the first single communication sent to the first back-end lookup computer.

8. The system of claim 5, wherein the state information associated with each of the plurality of DNS queries comprises at least one of: a source address or a protocol type.

* * * * *